United States Patent
Heikkinen et al.

(10) Patent No.: US 12,470,896 B2
(45) Date of Patent: Nov. 11, 2025

(54) SYSTEMS AND METHODS FOR IMPROVING GROUPCAST MEDIA STREAMING USING METRIC INFORMATION IN DEVICE-TO-DEVICE COMMUNICATIONS

(71) Applicant: Adeia Guides Inc., San Jose, CA (US)

(72) Inventors: Antti Heikkinen, Oulu (FI); Mikko Uitto, Oulu (FI)

(73) Assignee: Adeia Guides Inc., San Jose, CA (US)

( * ) Notice: Subject to any disclaimer, the term of this patent is extended or adjusted under 35 U.S.C. 154(b) by 410 days.

(21) Appl. No.: 18/087,376

(22) Filed: Dec. 22, 2022

(65) Prior Publication Data

US 2024/0214776 A1  Jun. 27, 2024

(51) Int. Cl.
| | |
|---|---|
| *H04W 4/00* | (2018.01) |
| *H04L 1/1812* | (2023.01) |
| *H04W 4/02* | (2018.01) |
| *H04W 4/06* | (2009.01) |
| *H04W 76/14* | (2018.01) |

(52) U.S. Cl.
CPC ............ *H04W 4/06* (2013.01); *H04L 1/1812* (2013.01); *H04W 4/023* (2013.01); *H04W 76/14* (2018.02)

(58) Field of Classification Search
CPC ....... H04W 4/06; H04W 76/14; H04W 4/023; H04L 1/1812
See application file for complete search history.

(56) References Cited

U.S. PATENT DOCUMENTS

| | | | |
|---|---|---|---|
| 10,721,715 B2 | 7/2020 | Ramamurthi et al. | |
| 11,824,665 B2 * | 11/2023 | Lee | H04L 1/1854 |
| 2012/0099419 A1 | 4/2012 | Kim et al. | |
| 2014/0036667 A1 | 2/2014 | Balasubramanian et al. | |
| 2021/0306089 A1 * | 9/2021 | Fehrenbach | H04L 5/0053 |
| 2022/0078727 A1 | 3/2022 | Chennichetty et al. | |

(Continued)

FOREIGN PATENT DOCUMENTS

| | | |
|---|---|---|
| CN | 102067499 A | 5/2011 |
| CN | 106817721 A | 6/2017 |
| WO | 2020088815 A1 | 5/2020 |

(Continued)

OTHER PUBLICATIONS

ZTE, "Discussion on PC5 connection establishment and maintenance" (http://www.3gpp.org/ftp/Meetings_3GPP_SYNC/RAN2/Docs/), (retrieved on Feb. 12, 2017), (4 pages).

(Continued)

*Primary Examiner* — Erika A Washington
(74) *Attorney, Agent, or Firm* — HALEY GUILIANO LLP

(57) ABSTRACT

Systems and methods are provided for improving communications between computing devices. A content item is received at a first computing device, and a sidelink channel is initiated between the first computing device and a second computing device. A first portion of the content item is transmitted from the first computing device to the second computing device via the sidelink channel. Feedback is generated, based on a condition of the sidelink channel, at the second computing device, and the feedback is transmitted from the second computing device to the first computing device. An action to perform is identified based on the feedback, and the action is performed.

20 Claims, 12 Drawing Sheets

(56) References Cited

U.S. PATENT DOCUMENTS

2023/0388755 A1* 11/2023 Ganesan ............... H04L 1/1825

FOREIGN PATENT DOCUMENTS

| WO | 2021034691 A1 | 2/2021 |
| WO | 2021104074 A1 | 6/2021 |
| WO | 2022032625 A1 | 2/2022 |
| WO | 2022228743 A1 | 11/2022 |

OTHER PUBLICATIONS

3GPP TS 26.247 V17-1-0, Technical Specification, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 17), (152 pages) (2022).
3GPP TS 38.300 V17.0.0, Technical Specification, 3rd Generation Partnership Project; Technical Specification Group Radio Access Network; NR; NR and NG-RAN Overall Description; Stage 2; (Release 17), (218 pages) (2022).
Fecheyr-Lippens, "A Review of HTTP Live Streaming," (30 pages) (2010).
Anonymous, "Information technology—Dynamic adaptive streaming over HTTP (DASH)—Part 1: Media presentation description and segment formats," International Standard, ISO/IEC 23009-1, Fifth Edition, (330 pages) (2022).
Mohan et al., "Active and Passive Network Measurements: A Survey," International Journal of Computer Science and Information Technologies, 2(4):1372-1385 (2011).
Stockhammer et al., "Dynamic Adaptive Streaming over HTTP—Design Principles and Standards," International Journal of Computer Science and Information Technologies, 2(4)1372-13 (2011).

* cited by examiner

SYSTEMS AND METHODS FOR IMPROVING GROUPCAST MEDIA STREAMING USING METRIC INFORMATION IN DEVICE-TO-DEVICE COMMUNICATIONS

BACKGROUND

The present disclosure is directed towards systems and methods for improving communications between computing devices. In particular, systems and methods are provided herein that enable actions to be performed based on feedback relating to a condition of a sidelink channel between computing devices.

SUMMARY

With the proliferation of computing devices, such as smartphones and head-mounted displays, there has been an increase in the number of computing devices that can consume high-quality content items, such as movies in ultra-high definition and/or extended reality content, including virtual reality content. Delivering the high-quality content items to computing devices tends to require large amounts of bandwidth and, for example, even compressed high-quality content items can have bitrates of several megabits per second. Typical computing devices have multiple network interfaces that allow a single computing device to be connected to multiple networks, such as cellular and/or wireless local area networks, and/or directly to other computing devices using a device-to-device (D2D) and/or a sidelink connection. By using a sidelink connection between computing devices, a user can simultaneously share content, such as network content and/or whatever is on their screen, with multiple other local computing devices. A sidelink groupcast communication may be utilized to simultaneously share the content between transmitting computing devices and multiple receiving computing devices. Using a sidelink connection to share content between computing devices may reduce the network resources that are required for each user when compared to, for example, uploading content to be shared to a server and each user individually retrieving the content from the server. The computing devices that receive the content shared via the sidelink connection may, however, be located at different distances from the transmitting computing device. In addition, the location of the receiving computing devices may change with respect to the transmitting device, for example, if a user is walking about with their smartphone. As a result, the characteristics of the radio channels being used to transmit content to the receiving computing devices may vary, which in turn may degrade the service for at least some receiving computing devices. For example, the quality of video content being shared may be degraded including stalls, buffering and fluctuation in quality during a video session, which would lead to a low quality of experience for the user. In another example, bandwidth may be wasted and energy consumption may be increased if several retransmissions are required to successfully deliver content to a receiving computing device. A further example may include a receiving computing device not being able to access content at all if the quality of the sidelink radio channel degrades beyond a threshold point.

To help address these issues, systems and methods are provided herein for enabling actions to be performed based on feedback or metric messages relating to a condition of a sidelink channel between computing devices and relating to status of transmissions over the sidelink channel. In accordance with some aspects of the disclosure, a method is provided that includes receiving a content item at a first computing device and initiating a sidelink channel between the first computing device and a second computing device. A first portion of the content item is transmitted from the first computing device to the second computing device via the sidelink channel. At the second computing device, feedback is generated based, for example, on a condition of the sidelink channel, and the second computing device transmits the feedback to the first computing device. In this example, the first computing device identifies an action to perform based on the feedback, and initiates or causes performance of the action.

In an example system, a user shares a video that is received at a first smartphone with a plurality of other smartphones (e.g., with second to sixth smartphones) that are in the vicinity of the first smartphone. A sidelink channel is initiated between the first smartphone and the second to sixth smartphones. A first portion of the video is transmitted from the first smartphone, via the sidelink channel, to the second to sixth smartphones. In this example, an issue with the radio conditions for the sidelink channel between the third and the first smartphones may be identified and, based on the identified issue, feedback is generated at the third smartphone and the feedback is transmitted to the first smartphone. In response to receiving the feedback, the first smartphone may reduce the bitrate of the portions of video that are shared over the sidelink channel with the third smartphone.

The feedback may further comprise an identification of a change in radio conditions between, for example, the first computing device and the third computing device, and/or the feedback may further comprise a hybrid automatic repeat request message or a negative-acknowledgement message. The action may further comprise adapting a second portion of the content item based on the feedback and transmitting the adapted second portion of the content item from the first computing device to the third computing device via the sidelink channel.

Initiating the sidelink channel may further comprise initiating a sidelink channel between the first computing device and each of a plurality of computing devices, and transmitting the first portion of the content item may further comprise transmitting the first portion of the content item from the first computing device to each of the plurality of computing devices. Performing the action may further comprise receiving the content item at the second computing device, initiating a sidelink channel between the second computing device and each of the plurality of computing devices and transmitting a second portion of the content item from the second computing device to each of the plurality of computing devices.

Performing the action may further comprise determining a central area based on a determined location of each of the plurality of computing devices, determining that a relative location of the first computing device is outside of the central area and generating a notification for output at the first computing device in response to determining that the relative location of the first computing device is outside of the central area.

The notification may comprise instructions to change the relative location of the first computing device to be inside the central area. Performing the action may further comprise identifying that a computing device of the plurality of computing devices cannot receive the first portion of the content item and terminating the sidelink channel between the first computing device and the identified computing device. Terminating the sidelink channel may further comprise transmitting a manifest file for a portion of the content item to the identified computing device.

Performing the action may further comprise determining a relative distance between the first computing device and the second computing device, identifying that the relative distance is greater than a threshold distance and generating a notification for output at the second computing device, wherein the notification may comprise instructions to reduce the relative distance to below the threshold distance. Performing the action may further comprise transmitting instructions to request a second portion of the content item directly from a server to the second computing device, transmitting a request for the second portion of the content item to the server and receiving the second portion of the content item at the second computing device.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 10:
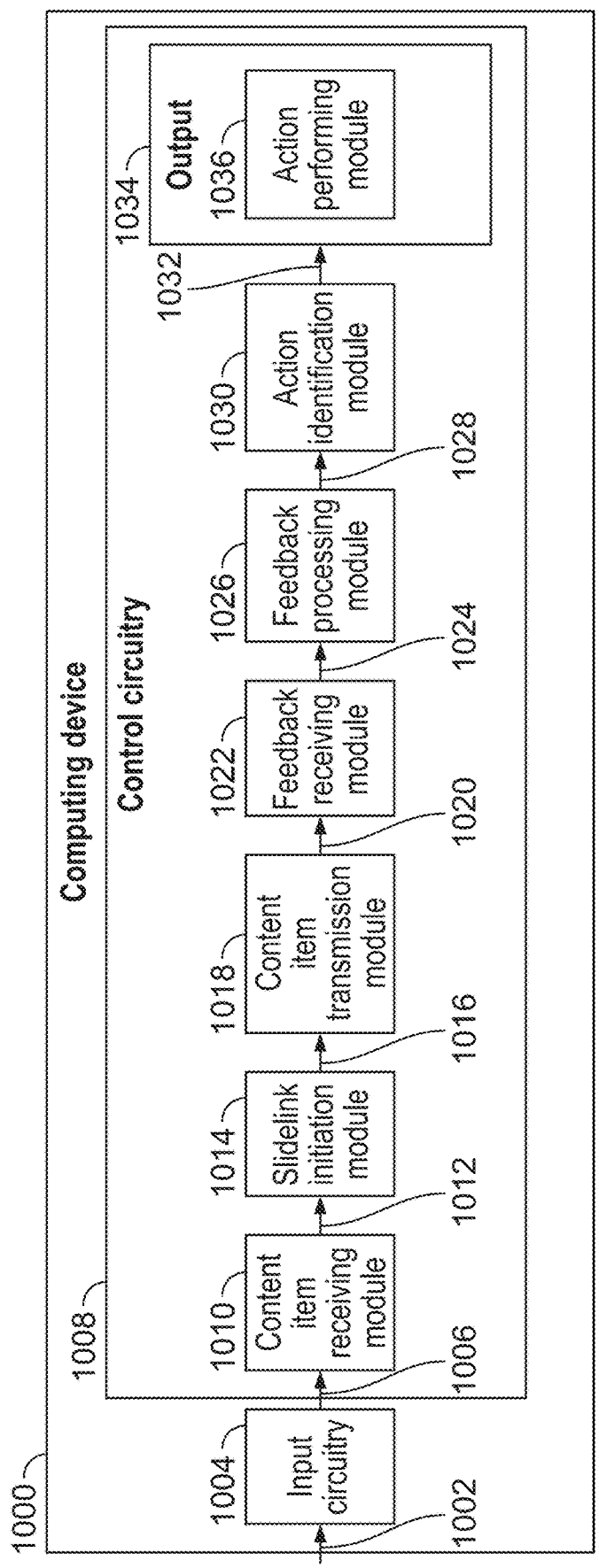
Figure 11:
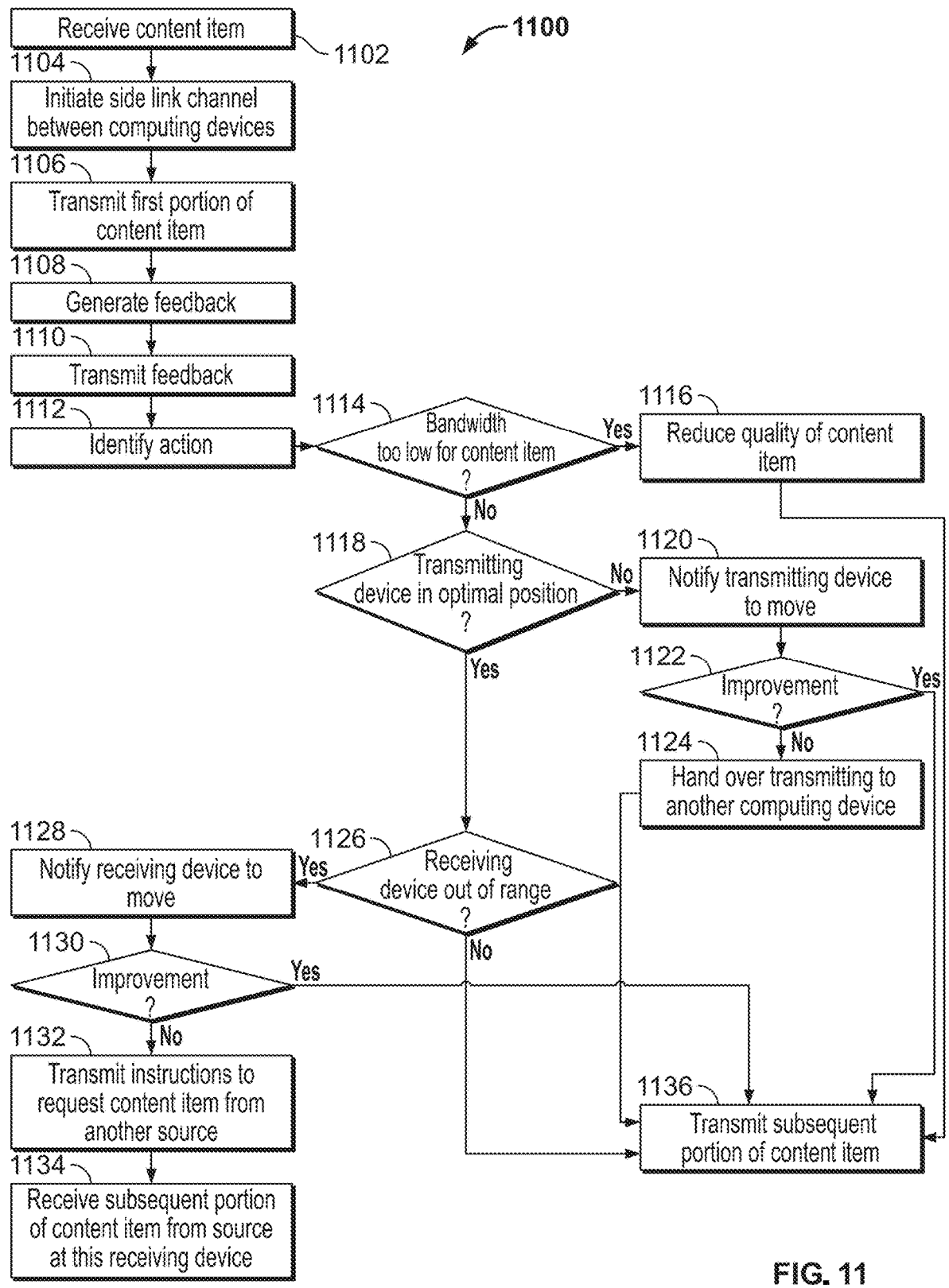

FIG. 10 shows a block diagram representing components of a computing device and dataflow therebetween for enabling actions to be performed based on feedback relating to a condition of a sidelink channel between computing devices, in accordance with some embodiments of the disclosure; and FIG. 11 shows a flowchart of illustrative steps involved in enabling actions to be performed based on feedback relating to a condition of a sidelink channel between computing devices, in accordance with some embodiments of the disclosure.

DETAILED DESCRIPTION

Systems and methods are described herein for enabling actions to be performed based on feedback relating to a condition of a sidelink channel between computing devices. A content item, or media content item, includes audio, video, text, a video game, a screen share and/or any other media content. A content item may be a single media item. In other examples, it may be a series (or season) of episodes of content items. Audio includes audio-only content, such as podcasts. Video includes audiovisual content such as movies and/or television programs. Text includes text-only content, such as event descriptions. An over-the-top (OTT), streaming and/or video-on-demand (VOD) service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

Sidelink communication enables direct communication, for example via a dedicated channel, between proximate computing devices, for instance multiple computing devices, without going through a base station or otherwise independent of a cellular network. In a wireless system, a computing device can communicate with a base station (for example, an Evolved Node B (eNB) for a Long-Term Evolution (LTE) base station, a Next Generation Node B (gNB) for a 5G base station and/or a Wi-Fi base station) via uplink and downlink channels in a communication network. A computing device can communicate directly with one or more computing devices by device-to-device or sidelink communication through sidelink channels. That means cars, robots, smartphones and other consumer devices can create their own ad hoc networks without using a radio access network as an intermediary. Sidelink communication may be part of a wireless communication system based on 3GPP Rel-16, Rel-17, or beyond. Sidelink solutions may support unicast, groupcast, and/or broadcast communications, and sidelink communication includes synchronization signals for the connected computing devices. Sidelink communications include, for example, a physical sidelink control channel (PSCCH). A PSCCH is analogous to a traditional physical downlink control channel (PDCCH) in that it carries sidelink control information (SCI) messages, which contains information about the resource allocation of the physical sidelink shared channel.

Feedback includes any data and/or message that is generated based on a condition of the sidelink channel and that typically describes the condition of the sidelink channel. For example, feedback could be generated based on a degradation of the sidelink channel due to a first device moving away from a second device. In another example, feedback may include any data and/or message that is generated based on a condition of the data being transmitted over the sidelink channel. For example, feedback could be generated based on a content item buffering. An example of feedback is hybrid automatic repeat request (HARQ) feedback. HARQ is a form of error control comprising forward error correction and automatic repeat requests. In HARQ, the original data may be encoded with a forward error correcting code, and parity bits may be transmitted with the data that is being transmitted, or in response to an error message. HARQ feedback may comprise acknowledgement (ACK) and negative acknowledgement (NACK) messages. An ACK message is a message that signifies receipt of data. NACK is a message that is sent to indicate a need for re-transmission and/or some kind of error. The HARQ messages may enable a transmission response to the sender, which can be implemented via a NACK message. In another example, an ACK message may not be received within a predetermined time. Not receiving an ACK message within a predetermined time may be effectively treated as a NACK message, or otherwise as an indication that transmitted data was not received, decoded successfully, and/or resulted in some other error.

According to an embodiment, the distance between computing devices and/or the location of computing devices may be determined. For example, the location of a transmitting computing device may be derived from latitude and longitude data, received, for example, via global positioning system (GPS), global navigation satellite system (GLONASS), Galileo, Beidou, NavIC and/or quasi-zenith satellite system (QZSS) satellites. In another example, a receiving computing device may take the center of a transmission zone, or area, as an approximation for the location of the transmitting computing device in order to calculate its distance to the transmitting computing device.

In a sidelink groupcast communication, it may be possible to provide HARQ feedback using one of two modes, or options. In a first mode (mode 1), when a receiving computing device is in communication range with a transmitting computing device, the receiving computing device may send HARQ feedback using a physical sidelink feedback channel. If the receiving computing device is outside of the communication range of the transmitting computing device, then best-effort communication may be used. For example, receiving computing devices may be able to receive data but do not send a NACK message, even in the case of transmission errors. In this first mode, a transmitting computing device may not be able to identify which receiving computing devices sent a NACK message, but the transmitting computing device may be aware that at least one receiving computing device within the communication range did not correctly receive a transmission. In a second mode (mode 2), all receiving computing devices may send HARQ feedback, and the transmitting computing device may be able to distinguish which receiving computing device sent the HARQ feedback.

A computing device may use different networks simultaneously or may select a network to be used for transmitting a content item, for example, for video streaming. In one example, multiple computing devices may be connected to a Wi-Fi network (such as a 802.11n, 802.11ac and/or 802.11ax network) and/or to a cellular network (such as an LTE and/or 5G network) and, at the same time, be connected to other computing devices via sidelink.

Content items that are delivered via sidelink are commonly delivered to users in a temporally segmented form. For example, content items may be delivered via an HTTP adaptive streaming protocol such as dynamic adaptive streaming over HTTP (DASH) or HTTP live streaming (HLS). Content items that are delivered in this manner may be made available in short media segments at different qualities (bitrates), and a receiving computing device can optimize a consumption experience by matching the quality of audio and/or video against fluctuating network conditions and/or computing loads. Streaming content, in particular content such as videos, to and from mobile devices faces several challenges, such as unstable wireless connections, limited throughput, long latency, and/or high jitter. HTTP adaptive streaming, video transcoding, and/or adaptive encoding may be used to address these challenges in mobile content streaming.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
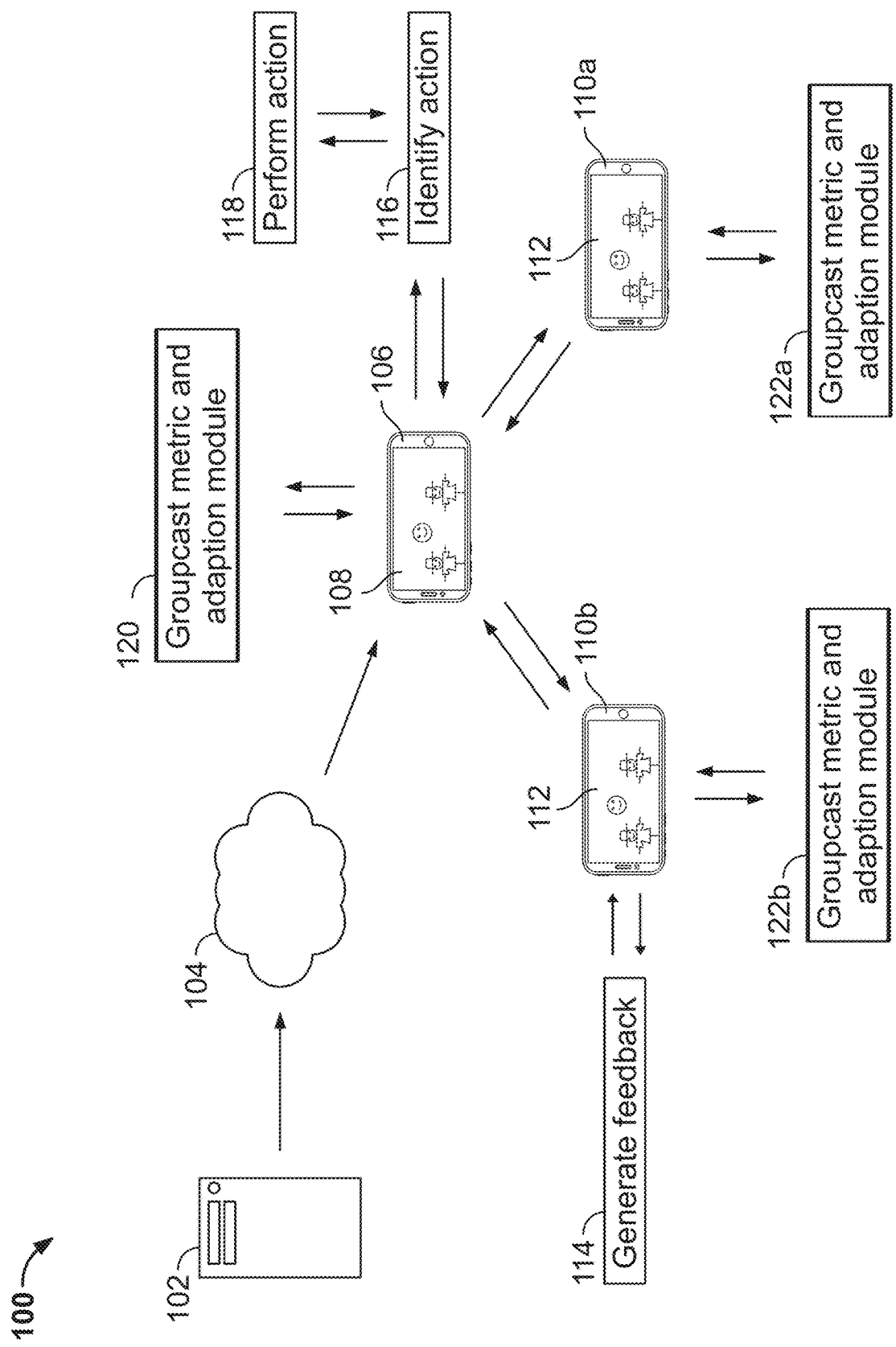
FIG. 1 shows an example environment for enabling actions to be performed based on feedback relating to a condition of a sidelink channel between computing devices, in accordance with some embodiments of the disclosure.

FIG. 1 shows an example environment for enabling actions to be performed based on feedback relating to a condition of a sidelink channel between computing devices, in accordance with some embodiments of the disclosure. The environment 100 comprises a server 102, a network 104, a transmitting computing device, in this example, a smartphone 106 and two receiving computing devices, in this example, a first smartphone 110a and a second smartphone 110b. Although two receiving computing devices are shown in this example, any number of receiving computing devices are contemplated including, for example, one, five, six, 10, 20, 50, and/or 100 receiving computing devices. A content item 108 is transmitted from server 102, via network 104, to transmitting smartphone 106. The network may be any suitable network, such as the internet, and may comprise wired and/or wireless means. Optionally, the content item may be generated for output at the transmitting smartphone 106. Input may be provided at the transmitting smartphone 106 to initiate sidelink channels with the receiving smartphones 110a, 110b. In other examples, the sidelink channels may be initiated automatically with any suitable computing devices in the vicinity of the transmitting smartphone 106. In another example, a list of preferred computing devices may be maintained at the transmitting smartphone 106, and a sidelink channel may be initiated with only the computing devices that are on the list. The list may be stored locally or remote from the transmitting smartphone 106.

On initiating the sidelink channels between the transmitting smartphone 106 and the receiving smartphones 110a, 110b, a portion 112 of the content item 108 that was received at the transmitting smartphone 106 is transmitted, via the sidelink channels, to the receiving smartphones 110a, 110b. The receiving smartphones 110a, 110b receive the portion 112 of the content item, and the portion 112 of the content item is, optionally, generated for display. In response to a degradation in a condition of the sidelink channel between the transmitting smartphone 106 and the first receiving smartphone 110b, feedback is generated 114 at the first receiving smartphone 110b. This feedback may be in the form of a HARQ message. The feedback is transmitted, via the sidelink channel, to the transmitting smartphone 106. Any of the smartphones 110a, 110b may generate a feedback message. In examples where there are more than two receiving computing devices, any of the receiving computing devices may generate feedback. In some examples, the feedback may be transmitted via the first and/or second modes as discussed above. On receiving the feedback, the transmitting smartphone 106 identifies 116 an action and may then perform 118 or cause performance of the action. The types of actions that can be identified and performed are discussed herein.

In another example, the transmitting smartphone 106 and the receiving smartphones 110a, 110b may be connected to each other via sidelink to form a device-to-device group, and the transmitting smartphone 106 may groupcast video to the receiving smartphones 110a, 110b in the sidelink group. The transmitting smartphone 106 may download DASH content from a content server 102 and transmit it to the receiving computing devices 110a, 110b in the group via, for example, a sidelink groupcast transmission in a physical sidelink shared channel (PSSCH). The transmitting smartphone 106 may start groupcasting the video and may select an optimal video bitrate based on the sidelink resource allocation. The transmitting smartphone 106 may set a minimum quality (e.g., resolution, framerate and/or bitrate) for a groupcast video that it guarantees. As such, if a receiving smartphone cannot receive the video at this minimum quality, it may be removed from the group or some other action may be performed to allow the receiving smartphone to receive the video at minimum quality. The receiving smartphones 110a, 110b may transmit feedback, such as HARQ feedback, in response to a groupcast transmission on a physical sidelink feedback channel (PSFCH) to the transmitting smartphone 106. In addition, the smartphones 106, 110a, 110b may share location and sidelink metric information. Metric information may comprise data that indicates information about a specific channel and/or communications data. For example, metric information may comprise data that indicates signal strength and/or location about a receiving computing device. Metric information may be transmitted over a dedicated channel, such as a control channel. A receiving smartphone 110a may transmit a HARQ retransmission request if, for example, it is not able to correct all transmission errors in the video via forward error correction (FEC) and/or it detects errors in the video transmission via an error detection code. The HARQ retransmission request enables the receiving smartphone 110a to request that a part of the content item is transmitted again if, for example, the error correction scheme cannot produce decodable data. FEC may be implemented in any way known in the art, for example, by encoding data in a redundant way. The redundancy may enable data errors to be corrected without the data having to be retransmitted.

The transmitting smartphone 106 may monitor HARQ and/or metric messages that the receiving smartphones 110a, 110b transmit. The messages may, for example, indicate that one, or several, segments of the video were not received successfully, and the messages may comprise metric information indicates that sidelink capacity is insufficient and/or a receiving smartphone 110a, 100b is outside a communication range. An action may be identified 116 and performed 118 in response to one or more of these messages. An example action includes selecting a best video representation and/or adjusting a target bitrate of the video or content item. Another example action includes selecting one of the receiving smartphones 110a, 110b to be a new transmitting smartphone. Another example action includes generating a notification at the transmitting smartphone 106 to move the transmitting smartphone 106 to a central location in relation to the receiving smartphones 110a, 110b. Another example action includes generating a notification at the receiving smartphone 110a that sent the feedback, such as a HARQ retransmission request, or if the receiving smartphone 110a is outside communication range, to move closer to the transmitting smartphone 106. Another example action includes transmitting data to a receiving smartphone 110a that sent the feedback, such as a HARQ retransmission request. In a further example, if the receiving smartphone 110a is outside communication range, alternative ways to access the content item may be transmitted. Another example action includes generating a notification at a receiving smartphone 110a that sent the feedback, such as a HARQ retransmission request, to leave the groupcast.

The transmitting smartphone 106 and the receiving smartphones 110a, 110b, may each comprise a groupcast metric and adaptation module 120, 122a, 122b. The groupcast metric and adaptation module may be used to improve the delivery of a content item, or content items, through groupcast from one computing device (a transmitting computing device) to a plurality of computing devices (receiving computing devices) connected to each other by a device-to-device or sidelink connection, thereby forming a group (or cluster). The content item transmitted from the transmitting computing device to the receiving computing device(s) may be received by the transmitting device via a content delivery network, or from other third-party services, or may be retrieved from a storage of the transmitting computing device itself. The transmitting computing device may use sidelink groupcast transmission to send the content item (e.g., video content) to other computing devices in the group. As discussed above, the receiving computing devices may send, for example, HARQ feedback, using the first mode or the second mode, to the transmitting computing device. The groupcast metric and adaptation module may monitor cross-layer parameters, such as a medium access control (MAC) layer parameter (HARQ), that other computing devices send. The groupcast metric and adaption module may also share metric information to other computing devices such as sidelink capacity and the location of computing devices in the group.

The groupcast metric and adaptation module may identify and perform actions in order to improve user experience. For example, the groupcast metric and adaptation module may perform bitrate adaptations in the application layer based on the cross-layer parameters and/or metric information. The adaptation may be performed by altering the bitrate, frame rate, and/or resolution settings of the streamed content item. In another example, the groupcast metric and adaptation module may change the computing device that is transmitting the content item to the group in order to achieve better transmission coverage of the group. In some examples, the groupcast metric and adaptation module may generate a notification via, for example, an application on the receiving and/or transmitting computing device to move to a location where coverage is better for sending or receiving content. In another example, the groupcast metric and adaptation module may notify a receiving computing device about an alternative way to receive and/or retrieve content. In addition, the groupcast metric and adaptation module may block certain computing devices from receiving content if sidelink channel capacity is insufficient.

The groupcast metric and adaptation module may monitor cross-layer parameters, such as a MAC layer parameter (HARQ) that other computing devices in a sidelink group transmit. The groupcast metric and adaptation module may monitor the quality of other public networks available to the computing devices, as well as the sidelink capacity, using passive and active network estimation techniques. The groupcast metric and adaptation module may function as radio network information service (RNIS) or utilize such a service from another network node. Signal quality indicators (e.g., received signal strength indicator (RSSI), reference signal received power (RSRP), sidelink-RSSI (S-RSSI) and/or sidelink-RSRP (S-RSRP)) can be used to determine the quality of networks. In addition, the groupcast metric and adaptation module may share the location and metric information of a computing device with other computing devices in the sidelink group.

Figure 2:
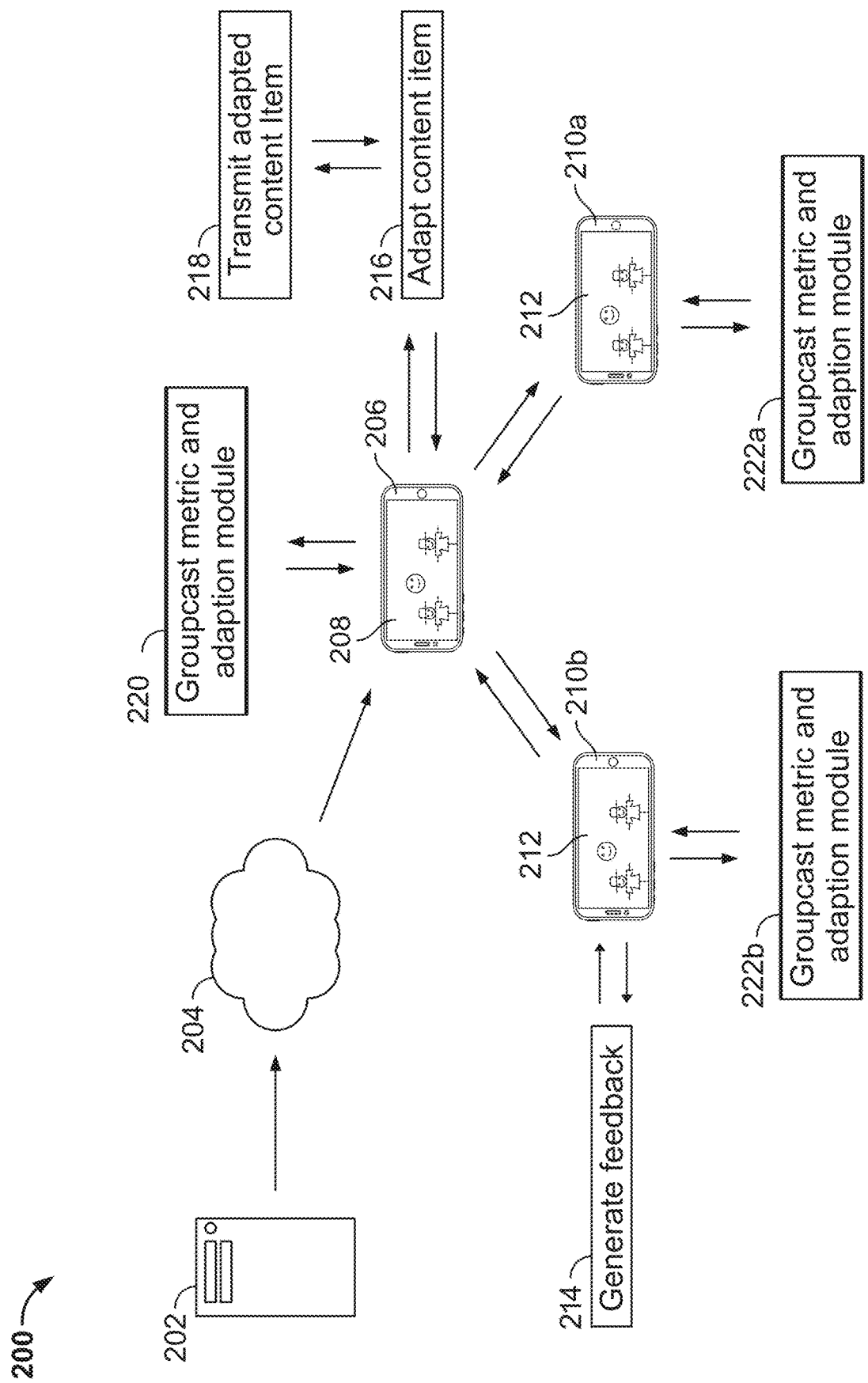
FIG. 2 shows another example environment for enabling actions to be performed based on feedback relating to a condition of a sidelink channel between computing devices, in accordance with some embodiments of the disclosure.

FIG. 2 shows another example environment for enabling actions to be performed based on feedback relating to a condition of a sidelink channel between computing devices, in accordance with some embodiments of the disclosure. In a similar manner to the environment shown in FIG. 1, the environment 200 comprises a server 202, a network 204, a transmitting computing device, in this example, a smartphone 206 and two receiving computing devices, in this example, a first smartphone 210a and a second smartphone 210b. Although two receiving computing devices are shown in this example, any number of receiving computing devices are contemplated including, for example, one, five, six, 10, 20, 50 and/or 100 receiving computing devices. A content item 208 is transmitted from server 202, via network 204, to transmitting smartphone 206. The network may be any suitable network, such as the internet, and may comprise wired and/or wireless means. Optionally, the content item may be generated for output at the transmitting smartphone 206. Input may be provided at the transmitting smartphone 206 to initiate sidelink channels with the receiving smartphones 210a, 210b. In other examples, the sidelink channels may be initiated automatically with any suitable computing devices in the vicinity of the transmitting smartphone 206.

On initiating the sidelink channels between the transmitting smartphone 206 and the receiving smartphones 210a, 210b, a portion 212 of the content item 208 that is received at the transmitting smartphone 206 is transmitted, via the sidelink channels, to the receiving smartphones 210a, 210b. The receiving smartphones 210a, 210b receive the portion 212 of the content item, and the portion 212 of the content item is, optionally, generated for display. In response to a degradation in a condition of the sidelink channel between the transmitting smartphone 206 and the first receiving smartphone 210a, feedback is generated 214 at the first receiving smartphone 210a. This feedback may be in the form of a HARQ message. The feedback is transmitted, via the sidelink channel, to the transmitting smartphone 206. Any of the smartphones 210a, 210b may generate a feedback message. On receiving the feedback, the transmitting smartphone 206 adapts 216 the content item 208 and transmits 218 the adapted content item to the receiving smartphones 210a, 210b. Adapting 216 the content item 208 may comprise reducing the resolution, framerate and/or bitrate of the content item. In some examples, a minimum quality may be set, such that the content item may not be adapted 216 below the minimum quality. As the transmitting smartphone 206 typically transmits the portions of the content item via, for example, groupcast, all of the receiving smartphones 210a, 210b receive the adapted portions of the content item. The transmitting smartphone 206 and the receiving smartphones 210a, 210b, may each comprise a groupcast metric and adaptation module 220, 222a, 222b.

In another example, the bitrate of a content item, such as a video, is adjusted by selecting an optimal DASH representation and/or by adjusting the encoder or transcoder target bitrate of the content item to be transmitted to the receiving computing devices, for example, via groupcast. If the content item is DASH content originating from a server, such as a content server, the transmitting computing device may download all the available representations from the server and buffer them locally. In another example, the transmitting computing device may download only a portion of the available representations of a content item according to a threshold determined for the transmitting bitrate, for example via groupcast. For example, a first receiving computing device may report HARQ to the transmitting computing device using either mode 1 or 2 (as discussed above). A groupcast metric and adaption module 220 in the transmitting computing device may decrease the content item bitrate, for example, from 10 Mbit/s (for full HD resolution) to 3 Mbit/s (for SD resolution) of the content item to be transmitted to the receiving computing devices. If, for example, the transmitting device guarantees a minimum quality threshold of a content item with a bitrate of 10 Mbit/s, then the groupcast metric and adaption module may generate a notification for the first receiving computing device to leave the group session, for example, a groupcast session.

Figure 3:
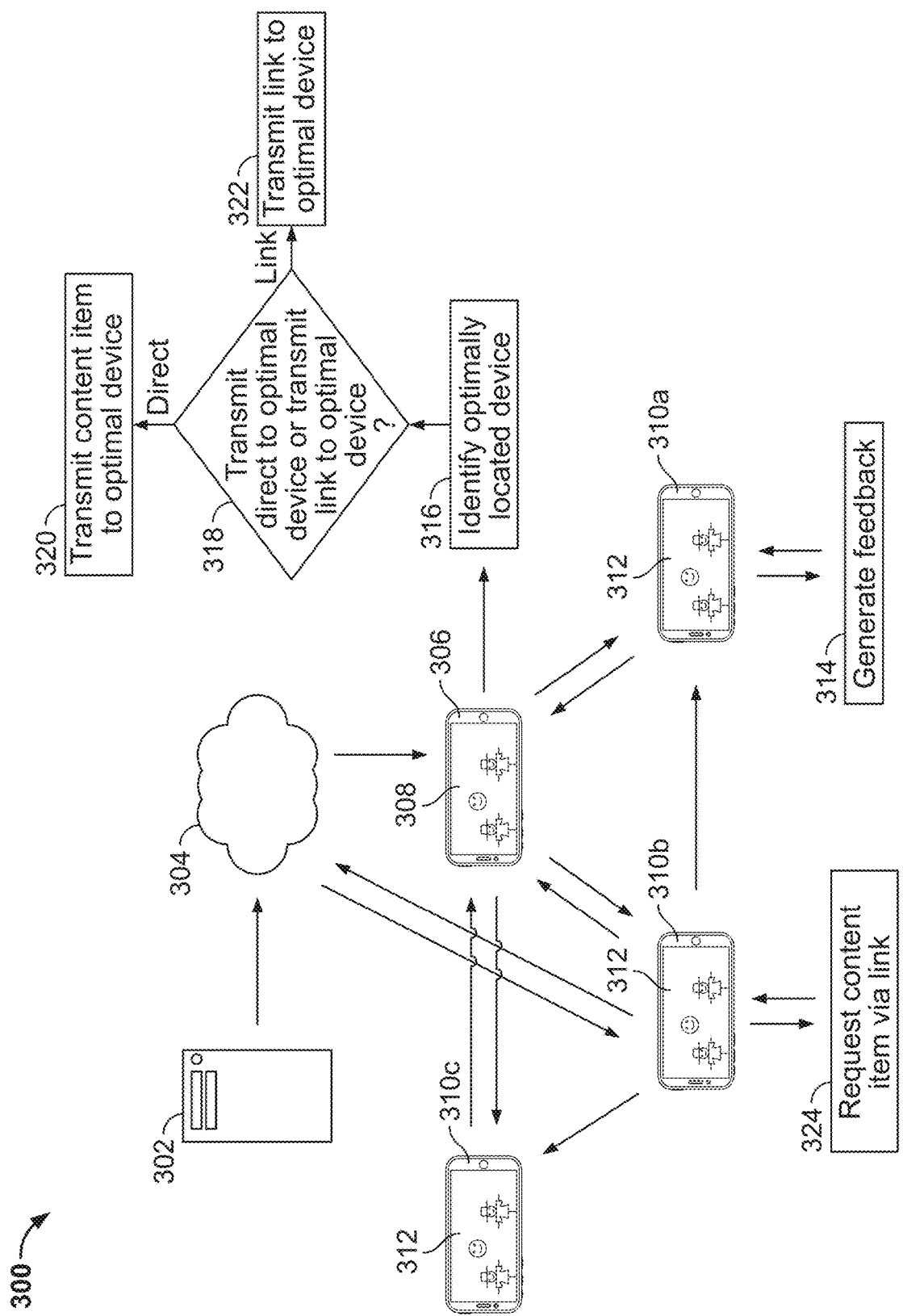
FIG. 3 shows another example environment for enabling actions to be performed based on feedback relating to a condition of a sidelink channel between computing devices, in accordance with some embodiments of the disclosure.

FIG. 3 shows another example environment for enabling actions to be performed based on feedback relating to a condition of a sidelink channel between computing devices, in accordance with some embodiments of the disclosure. In a similar manner to the environments shown in FIGS. 1 and 2, the environment 300 comprises a server 302, a network 304, a transmitting computing device, in this example, a smartphone 306 and three receiving computing devices, in this example, a first smartphone 310a, a second smartphone 310b and a third smartphone 310c. Although three receiving computing devices are shown in this example, any number of receiving computing devices are contemplated including, for example, one, five, six, 10, 20, 50 and/or 100 receiving computing devices. A content item 308 is transmitted from server 302, via network 304, to transmitting smartphone 306. The network may be any suitable network, such as the internet, and may comprise wired and/or wireless means. Optionally, the content item may be generated for output at the transmitting smartphone 306. Input may be provided at the transmitting smartphone 306 to initiate sidelink channels with the receiving smartphones 310a, 310b, 310c. In other examples, the sidelink channels may be initiated automatically with any suitable computing devices in the vicinity of the transmitting smartphone 306.

On initiating the sidelink channels between the transmitting smartphone 306 and the receiving smartphones 310a, 310b, 310c, a portion 312 of the content item 308 that was received at the transmitting smartphone 306 is transmitted, via the sidelink channels, to the receiving smartphones 310a, 310b, 310c. The receiving smartphones 310a, 310b, 310c receive the portion 312 of the content item, and the portion 312 of the content item is, optionally, generated for display. In response to a degradation in a condition of the sidelink channel between the transmitting smartphone 306 and the first receiving smartphone 310a, feedback is generated 314 at the first receiving smartphone 310a. In this example, there has been a change in the radio conditions of the group such that transmitting smartphone 306 is no longer the optimal smartphone to transmit portions of the content item to the group. This feedback may be in the form of a HARQ message. The HARQ message may indicate a potential error (for example, via a retransmission request) and other metric information, such as feedback and/or location information may be used to determine the change in radio conditions. The feedback is transmitted, via the sidelink channel, to the transmitting smartphone 306. Any of the smartphones 310a, 310b, 310c may generate a feedback message.

On receiving the feedback, the transmitting smartphone 306 identifies 316 an optimally located device. In this examples, the transmitting smartphone may identify an optimally located device based at least in part on received location data for at least a subset of the smartphones 306, 310a, 310b, 310c, and/or on any other metric data that has been received. In the example of FIG. 3, it is determined that the second receiving smartphone 310b is the most optimally located. This determination may be due to the proximity of the second receiving smartphone 310b to the other smartphones 306, 310a, 310c, such as if smartphone 310b is in a central location and/or if the radio conditions associated with the smartphone 310b are the most optimal for transmitting content to the other smartphones 306, 310a, 310c in the group. At 318, it is determined whether to transmit the content item from the transmitting smartphone 306 to the second receiving smartphone 310b, or whether to transmit a link to the content item 308 to the second receiving smartphone 310b. If it is determined to transmit 320 the content item to the second receiving smartphone 310b, transmitting smartphone 306 transmits the portions of the content item to the second receiving smartphone 310b, which then transmits those portions to the other receiving smartphones 310a, 310c in the group. If it is determined to transmit 322 a link to the content item to the second receiving smartphone 310b, the link is transmitted from the transmitting smartphone 306, via the sidelink, to the second receiving smartphone 310b. The second receiving smartphone 310b requests 324 the content item, via network 304, from the server 302. The content item 308 is transmitted via network 304 to the second receiving smartphone 310b, which then transmits portions of the content item to the other smartphones 306, 310a, 310c in the group. The transmitting smartphone 306 and the receiving smartphones 310a, 310b, 310c may each comprise a groupcast metric and adaptation module (not shown) in a similar manner to that depicted in FIGS. 1 and 2.

In another example, the transmitting computing device may detect a change in the radio conditions of the group and select one of the receiving computing devices to be a new transmitting computing device. For example, a second receiving computing device may report HARQ to the transmitting device using either mode 1 or 2 (as discussed above). A groupcast metric and adaption module in the transmitting computing device may estimate, based on location information of the other receiving computing devices (for example, via a global navigation satellite system) in the group that the location of a fifth receiving computing device is the most optimal compared to other receiving devices in the group. For example, the fifth computing device may be able to transmit, for example via groupcast, a content item, such as a video, more efficiently to the other computing devices in the group. A groupcast metric and adaption module in the transmitting computing devices may request that the fifth receiving computing device transmits a content item, for example groupcasts a video, to the other computing devices in the group. The original transmitting computing device may either unicast the content item to the fifth receiving computing device, or transmit an external link to the fifth receiving computing device, where the fifth receiving computing device can receive the video via a network, such as the internet. In one example, the fifth receiving computing device proceeds to groupcast video at 10 Mbit/s to the other computing devices in the group.

Figure 4:
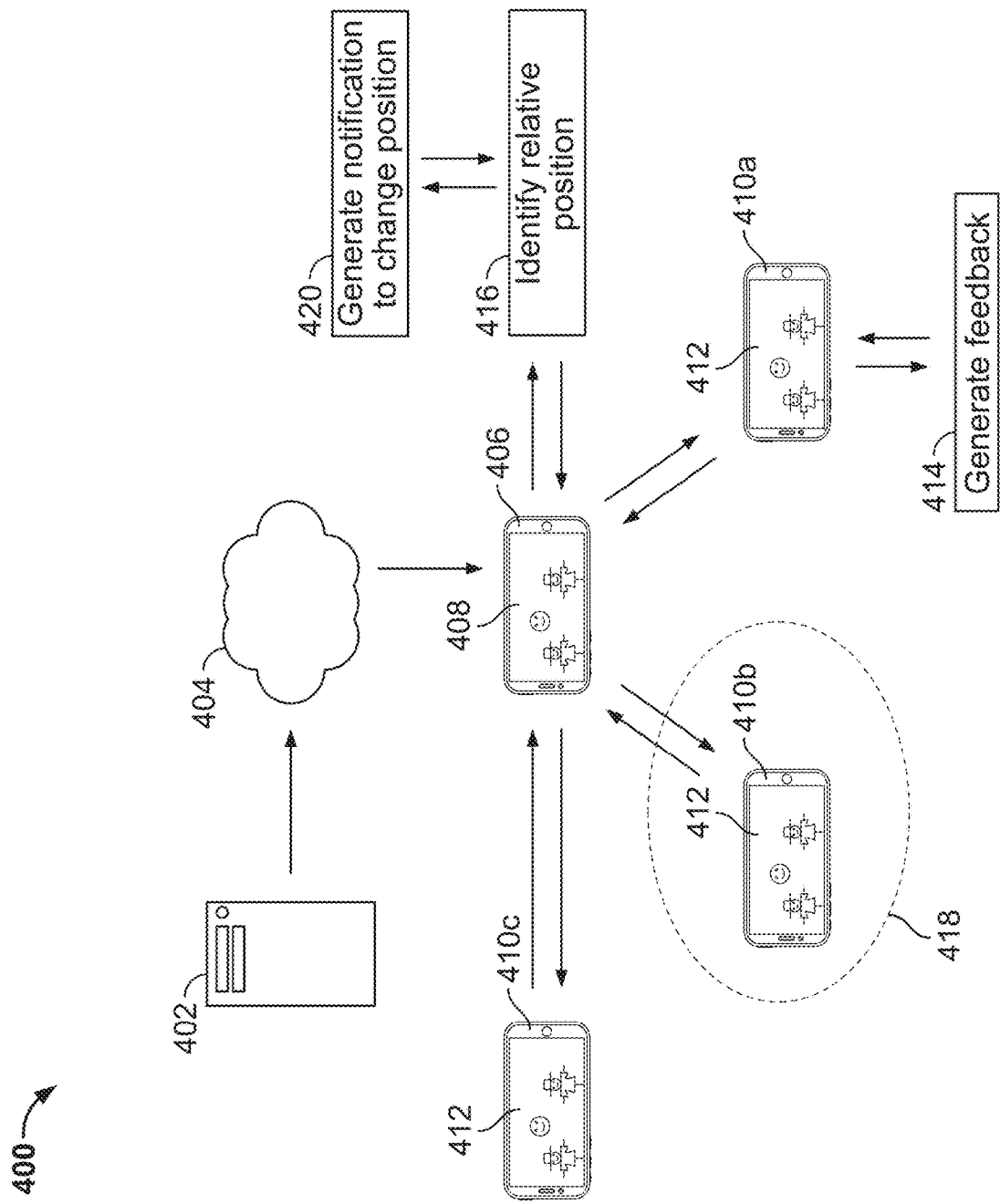
FIG. 4 shows another example environment for enabling actions to be performed based on feedback relating to a condition of a sidelink channel between computing devices, in accordance with some embodiments of the disclosure.

FIG. 4 shows another example environment for enabling actions to be performed based on feedback relating to a condition of a sidelink channel between computing devices, in accordance with some embodiments of the disclosure. In a similar manner to the environments shown in FIGS. 1-3, the environment 400 comprises a server 402, a network 404, a transmitting computing device, in this example, a smartphone 406, and three receiving computing devices, in this example, a first smartphone 410a, a second smartphone 410b and a third smartphone 410c. Although three receiving computing devices are shown in this example, any number of receiving computing devices are contemplated including, for example, one, five, six, 10, 20, 50, and/or 100 receiving computing devices. A content item 408 is transmitted from server 402, via network 404, to transmitting smartphone 406. Optionally, the content item may be generated for output at the transmitting smartphone 406. Input may be provided at the transmitting smartphone 406 to initiate sidelink channels with the receiving smartphones 410a, 410b, 410c. In other examples, the sidelink channels may be initiated automatically with any suitable computing devices in the vicinity of the transmitting smartphone 406.

On initiating the sidelink channels between the transmitting smartphone 406 and the receiving smartphones 410a, 410b, 410c, a portion 412 of the content item 408 that was received at the transmitting smartphone 406 is transmitted, via the sidelink channels, to the receiving smartphones 410a, 410b, 410c. The receiving smartphones 410a, 410b, 410c receive the portion 412 of the content item, and the portion 412 of the content item is, optionally, generated for display. In response to a degradation in a condition of the sidelink channel between the transmitting smartphone 406 and the first receiving smartphone 410a, for example, due to the transmitting smartphone 406 moving away from the first receiving smartphone 410a, feedback is generated 414 at the first receiving smartphone 410a. This feedback may be in the form of a HARQ message. The feedback is transmitted, via the sidelink channel, to the transmitting smartphone 406. Any of the smartphones 410a, 410b, 410c may generate a feedback message. On receiving the feedback, the transmitting smartphone 406 identifies 416 a relative position of the transmitting smartphone 406, for example, with respect to a central location 418. The transmitting smartphone 406 generates 420 a notification requesting that the transmitting smartphone 406 move closer to the central location 418. This notification may be output at the transmitting smartphone 406. The transmitting smartphone 406 and the receiving smartphones 410a, 410b, 410c may each comprise a groupcast metric and adaptation module (not shown) in a similar manner to that depicted in FIGS. 1 and 2.

In another example, the transmitting computing device may detect a change in the radio conditions in the group, and a notification may be generated at the transmitting computing device, requesting that a user of the transmitting computing device move the transmitting computing device to a more central location in relation to the other computing devices in the group. For example, the transmitting computing device may be moving due west from its current location. The transmitting computing device may receive HARQ from a third receiving computing device and a sixth receiving computing device using either mode 1 or 2 (as discussed above), based on HARQ feedback and the changing location of the transmitting computing device. A groupcast metric and adaption module may assists the transmitting computing device to, for example, move back east. In some examples, the transmitting computing device should be in a location where the coverage of the transmission to the other computing devices is as good as possible.

Figure 5:
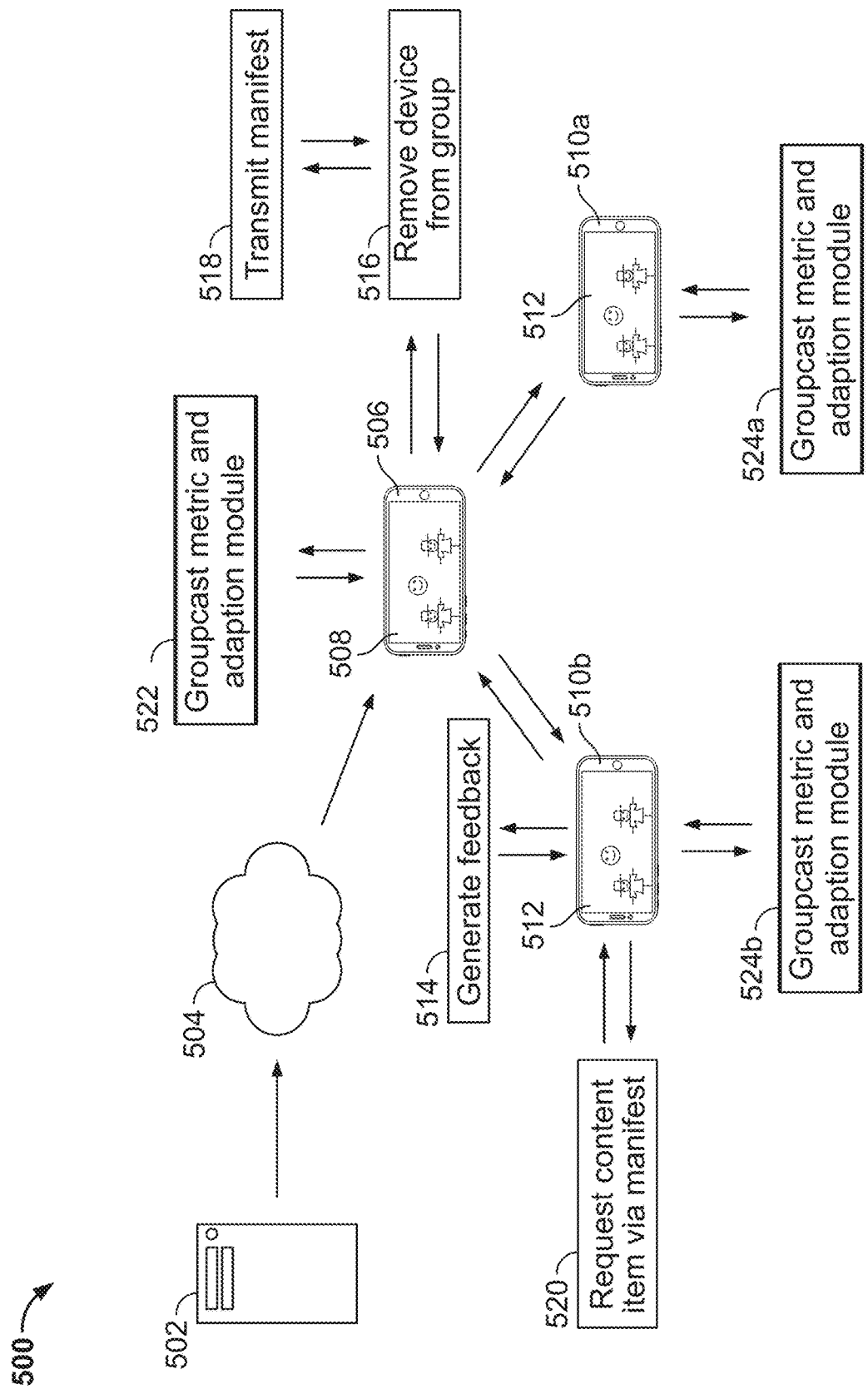
FIG. 5 shows another example environment for enabling actions to be performed based on feedback relating to a condition of a sidelink channel between computing devices, in accordance with some embodiments of the disclosure.

FIG. 5 shows another example environment for enabling actions to be performed based on feedback relating to a condition of a sidelink channel between computing devices, in accordance with some embodiments of the disclosure. In a similar manner to the environments shown in FIGS. 1-4, the environment 500 comprises a server 502, a network 504, a transmitting computing device, in this example, a smartphone 506 and two receiving computing devices, in this example, a first smartphone 510a and a second smartphone 510b. Although two receiving computing devices are shown in this example, any number of receiving computing devices are contemplated including, for example, one, five, six, 10, 20, 50, and/or 100 receiving computing devices. A content item 508 is transmitted from server 502, via network 504, to transmitting smartphone 506. The network may be any suitable network, such as the internet, and may comprise wired and/or wireless means. Optionally, the content item may be generated for output at the transmitting smartphone 506. Input may be provided at the transmitting smartphone 506 to initiate sidelink channels with the receiving smartphones 510a, 510b. In other examples, the sidelink channels may be initiated automatically with any suitable computing devices in the vicinity of the transmitting smartphone 506.

On initiating the sidelink channels between the transmitting smartphone 506 and the receiving smartphones 510a, 510b, a portion 512 of the content item 508 that was received at the transmitting smartphone 506 is transmitted, via the sidelink channels, to the receiving smartphones 510a, 510b. The receiving smartphones 510a, 510b receive the portion 512 of the content item, and the portion 512 of the content item is, optionally, generated for display. In response to a degradation in a condition of the sidelink channel between the transmitting smartphone 506 and the second receiving smartphone 510b, feedback is generated 514 at the second receiving smartphone 510b. This feedback may be in the form of a HARQ message. The feedback is transmitted, via the sidelink channel, to the transmitting smartphone 506. Either of the smartphones 510a, 510b may generate a feedback message. On receiving the feedback, the transmitting smartphone 506 identifies that the degradation in a condition of the sidelink channel between the transmitting smartphone 506 and the second receiving smartphone 510b is such that it cannot be addressed by, for example, adapting the content item, as described in connection with FIG. 2. In some examples, this may be due to needing to maintain a minimum quality level for the other members of the group. In response to identifying that the degradation in the condition of the sidelink channel cannot be addressed, the transmitting smartphone 506 removes 516 the second receiving smartphone 510b from the group. Optionally, before the second receiving smartphone 510b is removed from the group, a manifest file is transmitted 518 to the second receiving smartphone 510b, via the sidelink channel. The second receiving smartphone 510b may subsequently use this manifest file to request 520 the content item, via network 504, from the server 502. The transmitting smartphone 506 and the receiving smartphones 510a, 510b, may each comprise a groupcast metric and adaptation module 522, 224a, 224b.

In another example, the transmitting computing device may detect a change in the radio conditions of a receiving computing device in the group and may notify a receiving computing device that transmits HARQ retransmission requests using mode 2 (as discussed above) to leave the group or groupcast. For example, a third receiving computing device may report HARQ to the transmitting computing device. The transmitting computing device may not be able to decrease the bitrate of the content item because it is already at a minimum quality threshold level. A groupcast metric and adaption module in the transmitting computing device may have tried other options, as discussed herein, but they did improve the transmission of the content item. In this example, the groupcast metric and adaption module in the transmitting computing device may generate a notification for the third receiving computing device to leave the group and may transmit the notification, via a sidelink channel, to the third receiving computing device. On receiving the notification, the third receiving computing device may leave the group, or groupcast, session.

Figure 6:
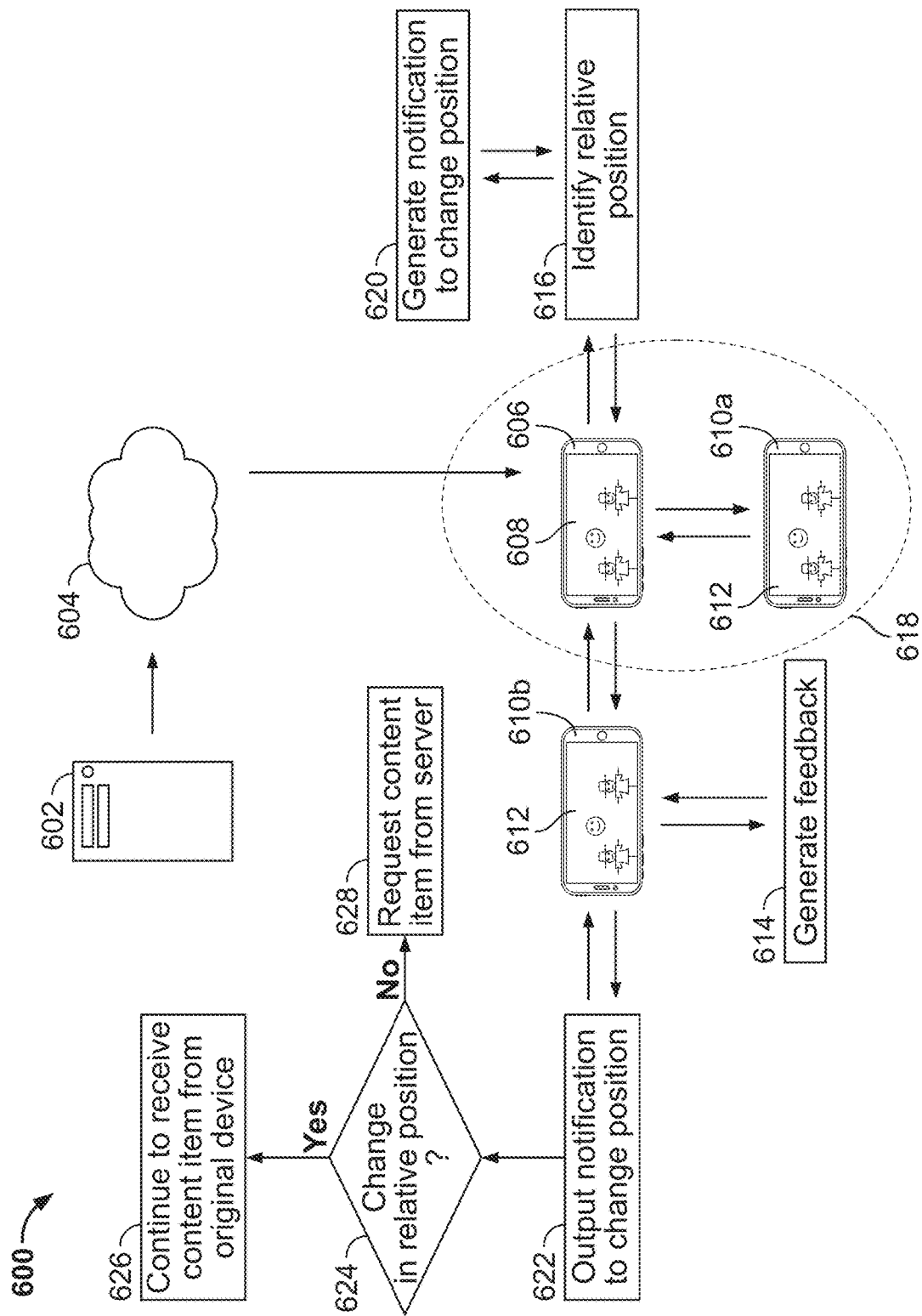
FIG. 6 shows another example environment for enabling actions to be performed based on feedback relating to a condition of a sidelink channel between computing devices, in accordance with some embodiments of the disclosure.

FIG. 6 shows another example environment for enabling actions to be performed based on feedback relating to a condition of a sidelink channel between computing devices, in accordance with some embodiments of the disclosure. In a similar manner to the environments shown in FIGS. 1-5, the environment 600 comprises a server 602, a network 604, a transmitting computing device, in this example, a smartphone 606 and two receiving computing devices, in this example, a first smartphone 610a and a second smartphone 610b. Although two receiving computing devices are shown in this example, any number of receiving computing devices are contemplated including, for example, one, five, six, 10, 20, 50, and/or 100 receiving computing devices. A content item 608 is transmitted from server 602, via network 604, to transmitting smartphone 606. The network may be any suitable network, such as the internet, and may comprise wired and/or wireless means. Optionally, the content item may be generated for output at the transmitting smartphone 606. Input may be provided at the transmitting smartphone 606 to initiate sidelink channels with the receiving smartphones 610a, 610b. In other examples, the sidelink channels may be initiated automatically with any suitable computing devices in the vicinity of the transmitting smartphone 606.

On initiating the sidelink channels between the transmitting smartphone 206 and the receiving smartphones 610a, 610b, a portion 612 of the content item 608 that was received at the transmitting smartphone 606 is transmitted, via the sidelink channels, to the receiving smartphones 610*a*, 610*b*. The receiving smartphones 610*a*, 610*b* receive the portion 612 of the content item, and the portion 612 of the content item is, optionally, generated for display. In response to a degradation in a condition of the sidelink channel between the transmitting smartphone 606 and the first receiving smartphone 610*a*, feedback is generated 614 at the second receiving smartphone 610*b*. This feedback may be in the form of a HARQ message. The feedback is transmitted, via the sidelink channel, to the transmitting smartphone 606. Any of the smartphones 610*a*, 610*b* may generate a feedback message. On receiving the feedback, the transmitting smartphone 606 identifies 616 a relative position of the second receiving smartphone 610*b*. In this example, the second receiving smartphone 610*b* is moving away from central location 618. A notification for the second receiving smartphone 610*b* to change position is generated at transmitting smartphone 606 and the notification is transmitted, via the sidelink channel, to the second receiving smartphone 610*b*. For example, the notification may request that the second receiving smartphone 610*b* moves towards the central location 618. The notification is received at the second receiving smartphone 610*b*, where it is generated for output 622. At 624, it is determined whether there has been a change in relative position of the second receiving smartphone 610*b*, in particular, a change in relative direction that improves the condition of the sidelink channel. For example, it may be determined whether the second receiving smartphone 610*b* is moving towards the central location 618. If it is determined that there is a change in relative position that improves the condition of the sidelink channel, then the second receiving smartphone 610*b* may continue to receive 626 the content item from the transmitting smartphone 606. If, on the other hand, it is determined that there has not been a change in relative position that improves the condition of the sidelink channel, the second receiving smartphone 610*b* may request 628 the content item directly from the server 602, via network 604. The transmitting smartphone 606 and the receiving smartphones 610*a*, 610*b* may each comprise a groupcast metric and adaptation module (not shown) in a similar manner to that depicted in FIGS. 1, 2 and 5.

In another example, the transmitting computing device may detect a change in the radio conditions and/or a location of a receiving computing device in the group. In response to detecting the change, the transmitting computing device may notify a receiving computing device that has sent a HARQ retransmission request and/or is outside communication range to move closer to the transmitting computing device. For example, a sixth receiving computing device may report HARQ to the transmitting computing device using either mode 1 or 2 (as discussed above). In another example, the sixth receiving computing device may move farther away from the transmitting computing device. Based on the location of the sixth receiving computing device, and location information at the border of the communication range, a groupcast metric and adaption module in the transmitting computing device may generate a notification to move northwest (i.e., closer to the transmitting computing device). This notification may be transmitted, via a sidelink channel, to the sixth receiving computing device.

In another example, a transmitting computing device may detect a change in the radio conditions, or location of a receiving computing device in the group. In response to a receiving computing device that sends a HARQ retransmission request, or is outside communication range, the transmitting computing device may transmit a notification to the receiving computing device to fetch the content item from another source, for example, directly from a content provider or from other computing device that is located closer to that receiving computing device. For example, the transmitting computing device may detect that a third receiving computing device is outside a communication range, and it has not moved any closer to the transmitting computing device despite a notification being sent to the third receiving computing device. A groupcast metric and adaption module in the transmitting computing device may transmit a notification to the third receiving computing device to fetch the content item, such as video, directly from a content server, using, for example, a cellular connection and/or via a user interface of the third receiving computing device.

In addition to, or instead of, the examples discussed herein, sidelink communication can be used to extend network coverage by using a computing device as a relay. A sidelink relay can be implemented by using a computing device as a relay that connects a remote computing device to a network. In another example, a relay computing device may connect a first remote computing device to a second remote computing device.

Figure 7:
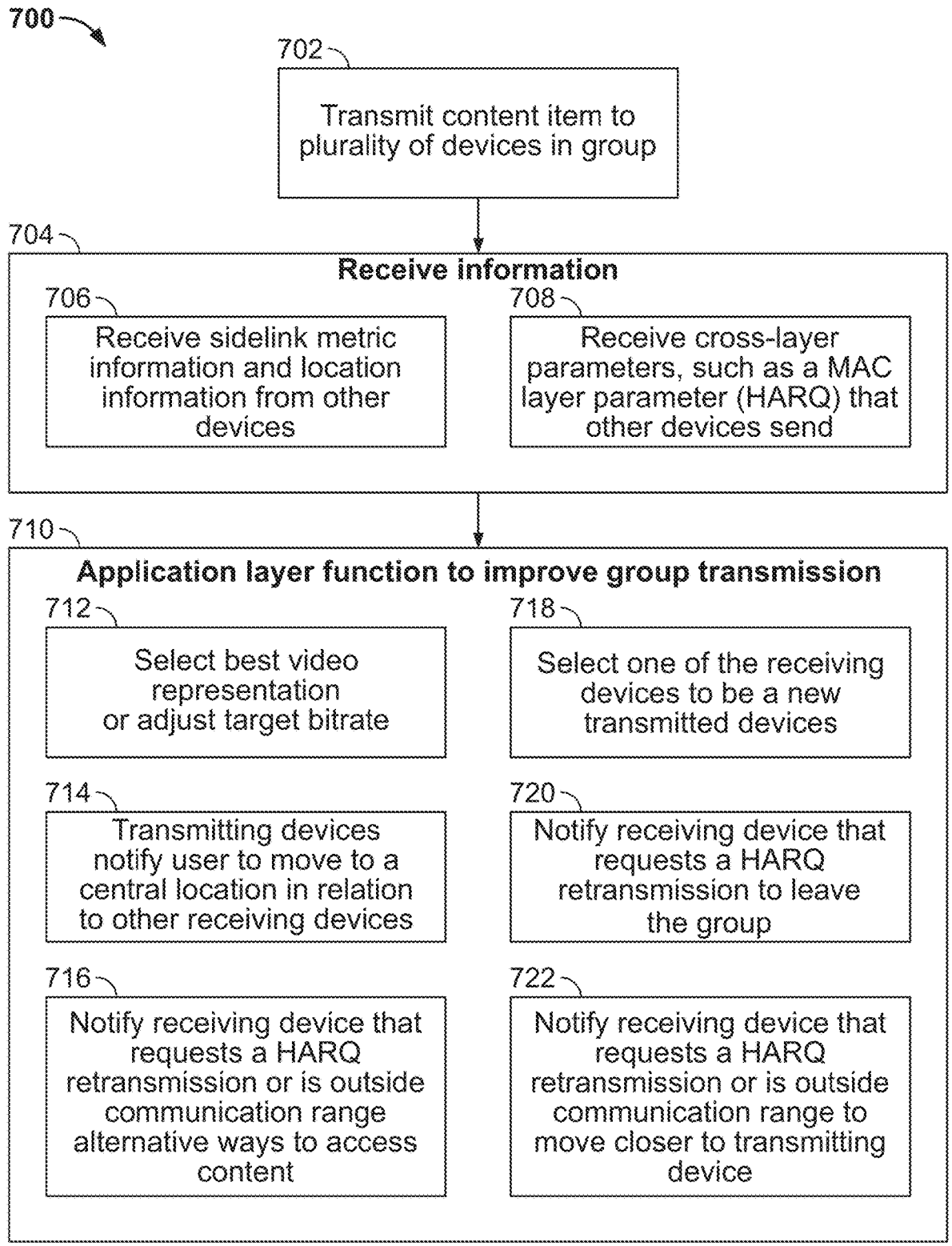
FIG. 7 shows a flowchart of illustrative steps involved in enabling actions to be performed based on feedback relating to a condition of a sidelink channel between computing devices, in accordance with some embodiments of the disclosure.

FIG. 7 shows a flowchart of illustrative steps involved in enabling actions to be performed based on feedback relating to a condition of a sidelink channel between computing devices, in accordance with some embodiments of the disclosure. Process 700 may be implemented on any of the aforementioned computing devices (e.g., computing device 106, 110*a*, 110*b*, 206, 210*a*, 210*b*, 306, 310*a*, 310*b*, 310*c*, 406, 410*a*, 410*b*, 410*c*, 506, 510*a*, 510*b*, 606, 610*a*, 610*b*). In addition, one or more actions of the process 700 may be incorporated into or combined with one or more actions of any other process or embodiments described herein.

At 702, a first computing device transmits a content item to a plurality of computing devices in a group, for example a plurality of computing devices connected via sidelink channels. At 704, the transmitting computing device receives information from the one or more of the other computing devices in the group. For example, at 706 the transmitting computing device receives sidelink metric information and/or location information from the one or more of the other computing devices in the group. In another example, at 708 the transmitting computing device receives cross-layer parameters, such as a MAC layer parameter (HARQ) from the one or more of the other computing devices in the group. At 710, one or more application layer functions 712, 714, 716, 718, 720, 722 are selected to improve the transmission of a content item to the group. At 712, a best content item (including video) representation is selected and/or the target bitrate of the content item is adjusted. At 714, a notification is generated for output at the transmitting computing device that requests the user of the transmitting computing device to move to a central location in relation to the receiving computing devices in the group. At 716, a notification is generated for output at a receiving computing device that requests a HARQ retransmission and/or, if the receiving computing device is outside of communication range with the transmitting computing device, one or more alternative ways to access the content item. At 718, one of the receiving computing devices is selected to be a new transmitting computing device. At 720, a notification is generated for output at a receiving computing device that requests a HARQ retransmission for the receiving computing device to leave the group. At 722, a notification is generated for output at a receiving computing device that requests a HARQ retransmission, and/or, outside of communication range with the transmitting computing device, to move closer to the transmitting computing device.

In another example, a content item may be transmitted from a transmitting computing device to a plurality of receiving computing devices in a sidelink group. For example, a video may be groupcasted from the transmitting computing device to a plurality of receiving computing devices. The transmitting computing device may fetch and/or stream DASH content from a content server and transmit it to the receiving computing devices in the group, using, for example, a sidelink groupcast transmission in a PSSCH. The DASH representations of the content item may be predetermined by a content provider, which can have, for example, different representations for bitrate, resolution, and/or frame rate. The receiving computing devices in the group may transmit HARQ feedback on a PSFCH in response to transmissions from the transmitting computing device. The computing devices of the group may share and provide location and/or sidelink metric information. A receiving computing device within communication range may transmit a HARQ retransmission request if it is not able to correct all transmission errors via FEC and if it detects errors in the transmission via an error detection code. A groupcast metric and adaption module in the transmitting computing devices may monitor any HARQ messages that the receiving computing devices transmit and, if they indicate that one or several portions of the content item were not successfully received by one or more of the receiving computing devices, the groupcast metric and adaption module in the transmitting computing device may select one or more of the functions 712, 714, 716, 718, 720, 722 described in connection with FIG. 7 above.

In another example, the content item may be a shared screen, or display, of the transmitting computing device. The screen may be shared with receiving computing devices in a sidelink group. The shared screen can be a point of view of a head-mounted display connected to the transmitting computing device and/or a 360° video of the full view of the head-mounted display. The transmitting computing device may comprise a groupcast metric and adaption module and a content item encoder that can dynamically change the target bitrate of the content item based on information provided by the groupcast metric and adaption module. The content item can be encoded and encapsulated in a segmented or in a non-segmented format. The content item encoder may encode the shared screen of the transmitting computing device with a target bitrate and may transmit, or groupcast, it to the receiving computing devices in the group. A receiving computing device may request retransmission via HARQ if the receiving computing device is not able to correct all transmission errors via FEC and if it detects errors in the transmission via error detection code. The groupcast metric and adaption module in the transmitting computing device may monitor HARQ messages that the receiving computing devices transmit. In the case of receiving one or more HARQ messages indicating that one or several portions of the content item were unsuccessfully received by one or more of the receiving computing devices, the groupcast metric and adaption module may dynamically adapt the target bitrate of the encoder and/or may change the computing device that is transmitting the content item to the group. Dynamic encoding can lead to more accurate groupcast bitrate and therefore improved video quality and quality of experience. In addition, the groupcast metric and adaption module may notify the application in a receiving computing device and/or the transmitting computing device to move to a location where coverage is better for sending or receiving the content item to the group, or groupcast.

Figure 8:
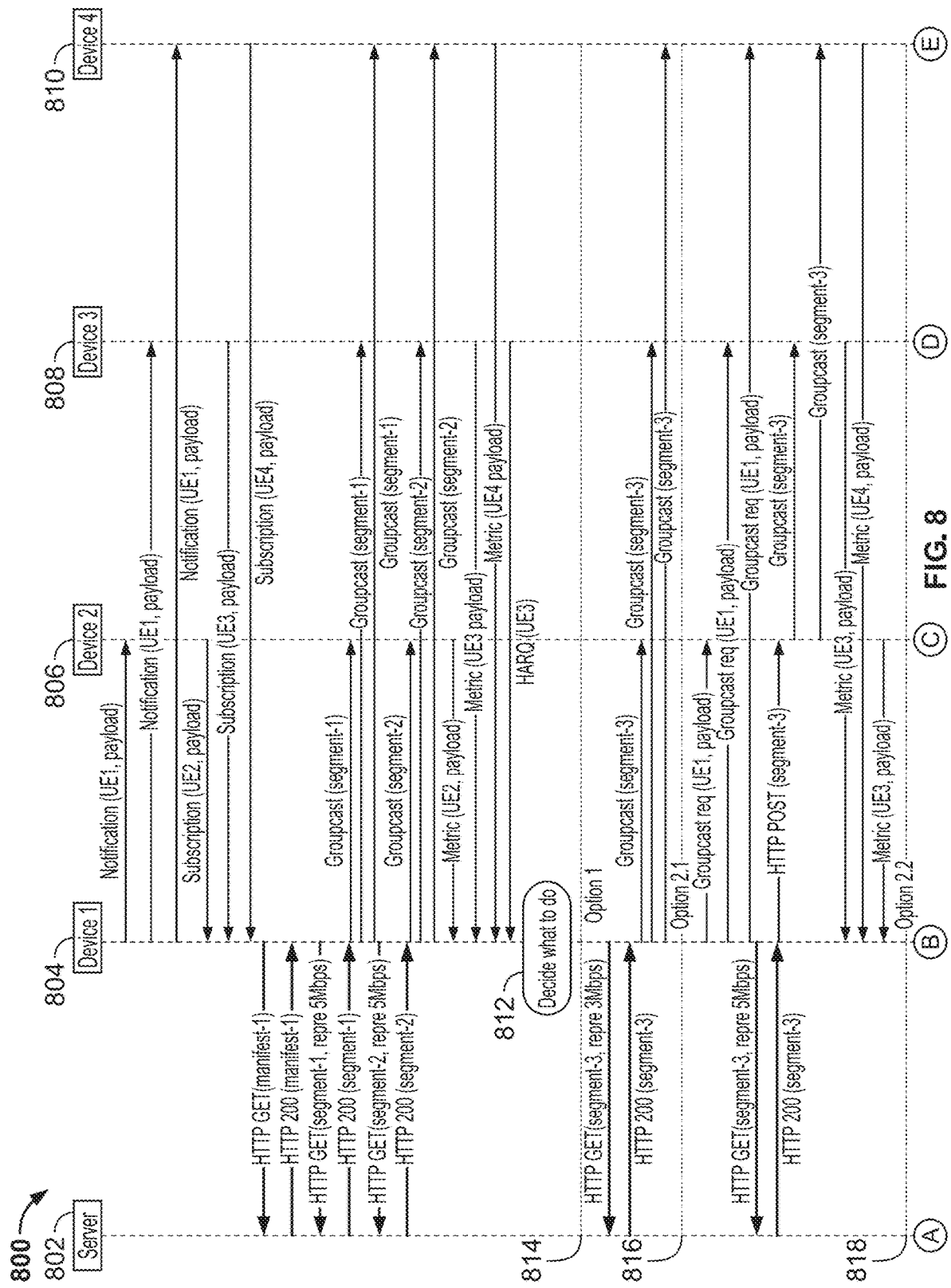
FIG. 8 shows a diagram of illustrative steps involved in enabling actions to be performed based on feedback relating to a condition of a sidelink channel between computing devices, in accordance with some embodiments of the disclosure.
Figure 8:
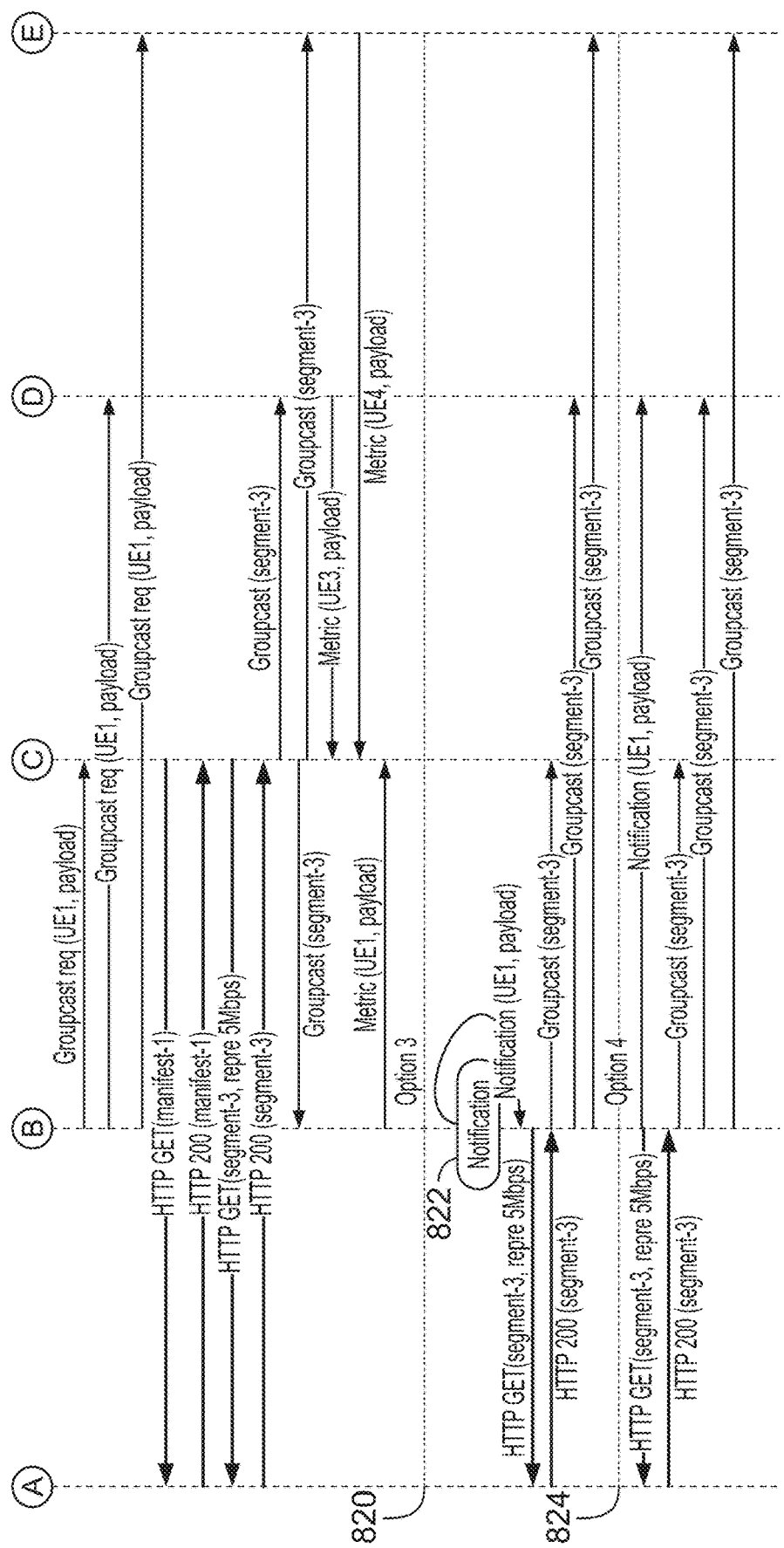

FIG. 8 shows a diagram of illustrative steps involved in enabling actions to be performed based on feedback relating to a condition of a sidelink channel between computing devices, in accordance with some embodiments of the disclosure. Process 800 is directed towards a server 802, a first computing device 804, a second computing device 806, a third computing device 808 and a fourth computing device 810. At 812, in response to a degradation in a condition of the sidelink channel, a number of options 814, 816, 818, 820, 824 are contemplated, including generating a notification 822 for output.

The first computing device 804, second computing device 806, third computing device 808 and fourth computing device 810 may comprise one or more applications for processing and outputting content items, such as video players. These applications may be instrumented with groupcast metric and adaption software. The first computing device 804, second computing device 806, third computing device 808 and fourth computing device 810 connect to one another via sidelink to form a device-to-device group. The computing devices 804, 806, 808, 810 may also have a connection to the internet via a public network. The first computing device 804 transmits a notification message to the other computing devices 806, 808, 810 in the group when it starts to share a content item, such as a video. The first computing device 804 may use unicast or groupcast communication in a sidelink channel. The notification message may comprise payload information about the first computing device 804, an identification, an address for messages and/or a location of the first computing device 804. The second computing device 806, third computing device 808 and fourth computing device 810 send a subscription message to the first computing device 804. The second, third and fourth computing devices 806, 808, 810 may use unicast communication in the sidelink channel. The subscription message payload may contain a computing device ID, computing device address, and/or a flag indicating access to a public network.

The first computing device 804 requests a manifest file from a content server using a public network connection. In this example, the manifest file may indicate that four different representations (bitrates) of the content item are available (e.g., 10 Mbit/s, 5 Mbit/s, 3 Mbit/s, and 1 Mbit/s). In this example, the groupcast metric and adaption module sets a guaranteed minimum quality of 3 Mbit/s. The first computing device 804 selects to groupcast the content item at 5 Mbit/s to other computing devices 806, 808, 810. The first computing device 804 transmits a GET request for segment-1 of the content item at a bitrate of 5 Mbit/s, to the content server using the public network connection. The first computing device 804 GETs segment-1 from the content server, and the first computing device 804 then shares segment-1 with the second, third and fourth computing devices 806, 808, 810 via the sidelink groupcast channel. The first computing device 804 transmits a GET request for segment-2 of the content item, at a bitrate of 5 Mbit/s, to the content server using the public network connection. The first computing device 804 GETs segment-2 from the content server, and the first computing device 804 then shares segment-2 with the second, third and fourth computing devices 806, 808, 810 via the sidelink groupcast channel. The second, third and fourth computing devices 806, 808, 810 transmit a metric message to the first computing device 804. They may use unicast communication in the sidelink channel. The metric message may comprise a payload including device ID, metric information about quality-of-service metrics of the sidelink, and/or computing device location. The third computing device 808 transmits a HARQ message (in this example, a NACK message) using HARQ mode 1 (as discussed above) in the MAC layer to first computing device 804. The groupcast metric and adaption module in the first computing device 804 may monitor cross-layer parameters, and, on receiving the HARQ message, it may decide 812 how to respond based on one of the options 1-4, as discussed below.

At 814, option 1 for responding is to decrease bitrate. In this example, the first computing device 804 selects the DASH representation with a bitrate of 3 Mbit/s. The first computing device 804 transmits a GET request for segment-3 of the content item at a bitrate of 3 Mbit/s to the content server using the public network. The first computing device 804 GETs segment-3 from the content server, and the first computing device 804 then shares segment-3 with the second, third and fourth computing devices 806, 808, 810 via the sidelink groupcast channel.

Option 2 for responding is to select one of the second, third or fourth computing devices 806, 808, 810 to be a new transmitting computing device, replacing the first computing device 804. In a first variation of option 2, at 816, option 2.1, the second, third or fourth computing device 806, 808, 810 is selected to be a new transmitting computing device based on the location of the computing device being the most optimal compared to the other computing devices and hence being able to groupcast a content item more efficiently to the other computing devices in the group. In this example, the second computing device 806 is selected to be the new transmitting computing device. The first computing device 804 transmits a groupcast request message to all computing devices 806, 808, 810 in the group. The first computing device 804 may use unicast or groupcast communication in the sidelink channel. The groupcast request message payload may comprise a new device ID that will be the new transmitting computing device, a device address where metric messages are to be sent, and the location of, in this example, the second computing device 806. The first computing device 804 transmits a GET request for segment-3 of the content at a bitrate of 5 Mbit/s to the content server using the public network. The first computing device 804 transmits segment-3 to the second computing device 806 via a POST request. The second computing device 806 groupcasts the content item to the third and fourth computing devices 808, 810. The second, third and fourth computing devices 806, 808, 810 transmit a metric message to the first computing device 804 in the group. The second, third and fourth computing devices 806, 808, 810 may use unicast or groupcast communication in the sidelink channel. The metric message may contain a payload comprising a device ID, metric information about quality-of-service metrics of the sidelink, and/or computing device location. In addition, the second computing device 806 may add HARQ metrics of the groupcast feedback.

In a second variation of option 2, at 818, option 2.2, the second, third or fourth computing device 806, 808, 810 is selected to be a new transmitting computing device based on the location of the computing device being the most optimal compared to the other computing devices and hence being able to groupcast a content item more efficiently to the other computing devices in the group and if the selected computing device network connection to the content server is sufficient. In this example, the second computing device 806 is selected to be the new transmitting computing device. The first computing device 804 transmits a groupcast request message to all computing devices 806, 808, 810 in the group. The first computing device 804 may use unicast or groupcast communication in the sidelink channel. The groupcast request message payload may comprise a new device ID that will be the new transmitting computing device, a device address where metric messages are to be sent, the location of, in this example, the second computing device 806 and a manifest file address. The second computing device 806 requests a manifest file from the content server using the public network connection. The second computing device 806 transmits a GET request for segment-3 of the content item at a bitrate of 5 Mbit/s to the content server using the public network. The second computing device 806 GETs segment-3 from the content server, and the second computing device 806 groupcasts segment-3 to the third and fourth computing devices 808, 810. The second, third and fourth computing devices 806, 808, 810 transmit a metric message to the first computing device 804 in the group. The second, third and fourth computing devices 806, 808, 810 may use unicast or groupcast communication in the sidelink channel. The metric message may contain a payload comprising a device ID, metric information about quality-of-service metrics of the sidelink, and/or computing device location. In addition, the second computing device 806 may add HARQ metrics of the groupcast feedback.

At 820, option 3 for responding is to generate a notification 822 for the first computing device 804, in this example the transmitting computing device, to move. If the location of the first computing device 804 has changed and/or it is not optimal for the other computing devices (the receiving computing devices) 806, 808, 810 to receive the content item, the groupcast metric and adaption module in the first computing device 804 generates a notification 822 to request that the first computing device 804 is moved in a particular direction, for example, southwest. A display of the first computing device 804 may display a notification 822 indicating a direction and a distance of where to go. The first computing device 804 transmits a GET request for segment-3 of the content item at a bitrate of 5 Mbit/s to the content server using the public network. The first computing device 804 GETs segment-3 from the content server, and the first computing device 804 groupcasts segment-3 to the second, third and fourth computing devices 806, 808, 810.

At 824, option 4 for responding is to notify one of the second, third or fourth computing devices 806, 808, 810 (the receiving computing devices) to move. In HARQ mode 1 (as discussed above), the first computing device 804 cannot identify a particular receiving computing device, such as the third computing device 808, based on HARQ feedback alone. If the location of a computing device 806, 808, 810 in the group has changed and/or is outside communication range, the first computing device transmits a notification message to that computing device, in this example the third computing device 808, to move closer to the first computing device 804. The notification message payload may comprise a device ID, the location of the first computing device 804, a direction, and/or a minimum distance to move. A display at the third computing device 808 may show a notification comprising a direction and distance of where to go. The first computing device 804 transmits a GET request for segment-3 of the content item at a bitrate of 5 Mbit/s to the content server using the public network. The first computing device 804 GETs segment-3 from the content server, and the first computing device 804 groupcasts segment-3 to the third and fourth computing devices 808, 810.

Figure 9:
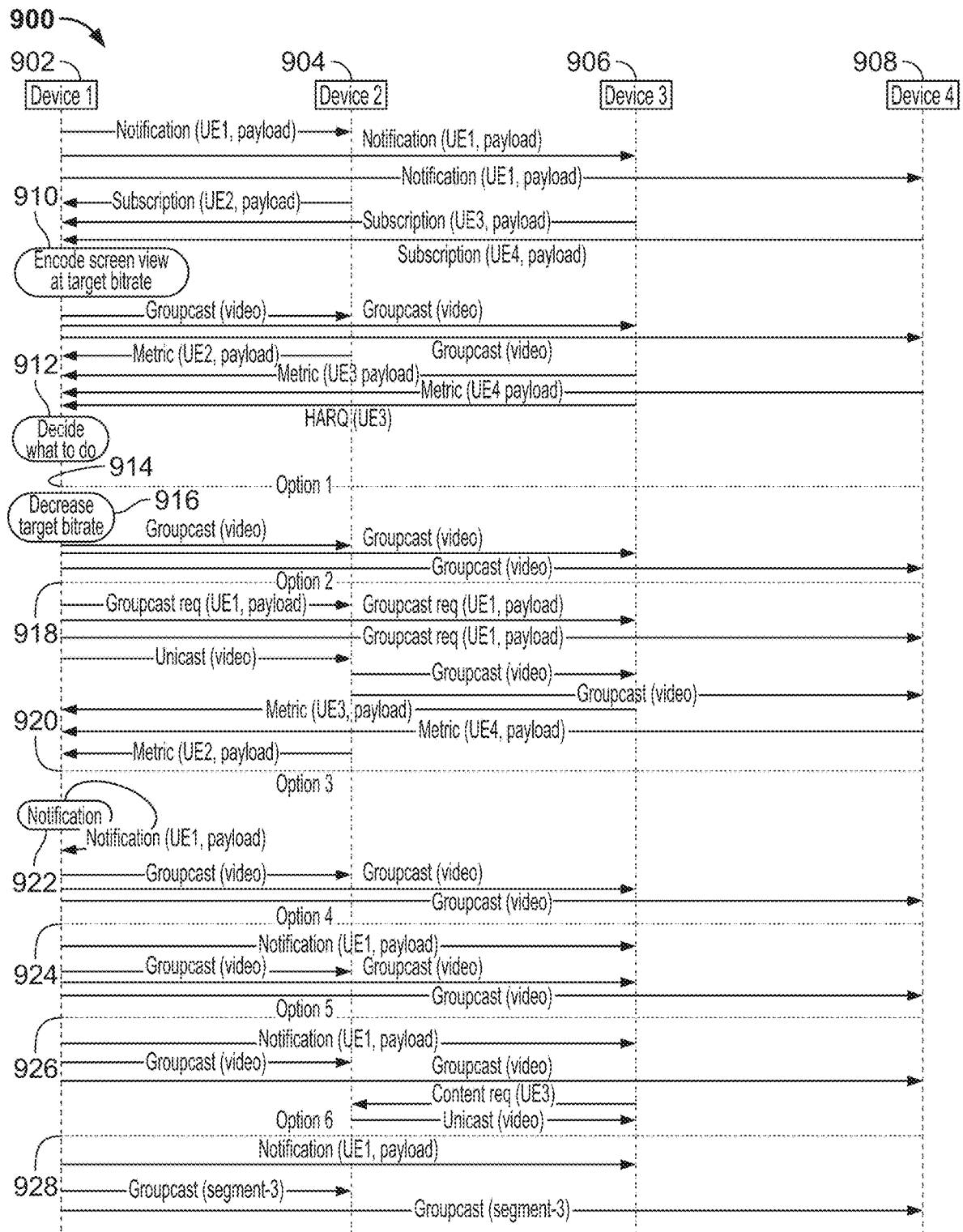
FIG. 9 shows another diagram of illustrative steps involved in enabling actions to be performed based on feedback relating to a condition of a sidelink channel between computing devices, in accordance with some embodiments of the disclosure.

FIG. 9 shows another diagram of illustrative steps involved in enabling actions to be performed based on feedback relating to a condition of a sidelink channel between computing devices, in accordance with some embodiments of the disclosure. Process 900 is directed towards a first computing device 902, a second computing device 904, a third computing device 906 and a fourth computing device 908. At 910, a screen view is encoded at a target bitrate, and at 912, in response to a degradation in a condition of the sidelink channel, a number of options 914, 918, 920, 924, 926, 928 are contemplated, including decreasing 916 a target bitrate of a content item, and generating a notification 922 for output.

The first computing device 902, second computing device 904, third computing device 908 and fourth computing device 908 may comprise one or more applications for processing and outputting content items, such as video players. These applications may be instrumented with groupcast metric and adaption software. The first computing device 902, second computing device 904, third computing device 906 and fourth computing device 908 connect to one another via sidelink to form a device-to-device group. The computing devices 902, 904, 906, 908 may also have a connection to the internet via a public network. The first computing device 902 transmits a notification message to the other computing devices 904, 906, 908 in the group when it starts to share a content item, such as a video. The first computing device 902 may use unicast or groupcast communication in a sidelink channel. The notification message may comprise payload information about the first computing device 902, an identification, address for messages and/or a location of the first computing device 902. The second computing device 904, third computing device 906 and fourth computing device 908 send a subscription message to the first computing device 902. The second, third and fourth computing devices 904, 906, 908 may use unicast communication in the sidelink channel. The subscription message payload may contain a computing device ID, computing device address, and/or a flag indicating access to a public network.

The first computing device 902 encodes 910 a content item comprising what is being displayed at a screen of the first computing device 902 at, for example, 10 Mbit/s and groupcasts the content item to the other computing devices 904, 906, 908 in the group. The second, third and fourth computing devices 904, 906, 908 transmit a metric message to the first computing device 902. The second, third and fourth computing devices 904, 906, 908 may use unicast communication in the sidelink channel. The metric message may comprise a payload including device ID, metric information about quality-of-service metrics of the sidelink, and computing device location. The third computing device 906 transmits a HARQ message (in this example, a NACK message) using HARQ mode 2 (as discussed above) in the MAC layer to first computing device 902. The groupcast metric and adaption module in the first computing device 902 may monitor cross-layer parameters and, on receiving the HARQ message, it may decide 912 how to respond based on one of the options 1-6, as discussed below.

At 914, option 1 for responding is to decrease 916 the target bitrate. In this example, the target bitrate is decreased from 10 Mbit/s to 9 Mbit/s. The first computing device 902 groupcasts the content item to the other computing devices 904, 906, 908 at a lower bitrate. If the third computing device 906 is still transmitting a HARQ message, or message, the target bitrate is decreased further to 8 Mbit/s. If the third computing device 906 is transmitting HARQ messages, and the minimum guaranteed quality is, for example, 8 Mbit/s, a notification is transmitted to the third computing device 906 to leave the groupcast session, and the third computing device 906 leaves the groupcast session.

At 916, option 2 for responding is to select one of the second, third or fourth computing devices 904, 906, 908 to be a new transmitting computing device, replacing the first computing device 902. One of the second, third or fourth computing devices 904, 906, 908 is selected to be a new transmitting computing device based on the location of the computing device being the most optimal compared to the other computing devices and hence being able to groupcast a content item more efficiently to the other computing devices in the group. In this example, the second computing device 904 is selected to be the new transmitting computing device. The first computing device 902 transmits a groupcast request message to all computing devices 904, 906, 908 in the group. The first computing device 902 may use unicast or groupcast communication in the sidelink channel. The groupcast request message payload may comprise a new device ID that will be the new transmitting computing device, a device address where metric messages are to be sent. The first computing device 902 transmits the content item to the second computing device 904 using unicast communication in the sidelink channel. The second computing device 902 groupcasts the content item to the third and fourth computing devices 904, 906. The second, third and fourth computing devices 904, 906, 908 transmit a metric message to the first computing device 902 in the group. The second, third and fourth computing devices 904, 906, 908 may use unicast or groupcast communication in the sidelink channel. The metric message may contain a payload comprising a device ID, metric information about quality-of-service metrics of the sidelink, and/or computing device location. In addition, the second computing device 904 may add HARQ metrics of the groupcast feedback.

At 920, option 3 for responding is to generate a notification 922 for the first computing device 902, in this example the transmitting computing device to move. If the location of the first computing device 902 has changed and/or it is not optimal for the other computing devices (the receiving computing devices) 904, 906, 908 to receive the content item, the groupcast metric and adaption module in the first computing device 902 generates a notification 922 to request that the first computing device 902 is moved in a particular direction, for example, southwest. A display of the first computing device 902 may display a notification 922 indicating a direction and a distance of where to go. The first computing device 902 groupcasts the content item to the second, third and fourth computing devices 904, 906, 908.

At 924, option 4 is to notify the second, third or fourth computing device 904, 906, 908 (a receiving computing device) to move. The first computing device 902 transmits a notification message to the, in this example, third computing device 906 that requests that the third computing device 906 is moved closer to the first computing device 902. The notification message payload may comprise a device ID, the location of the first computing device 902, a direction, and/or a minimum distance to move. A display at the third computing device 906 may display a notification comprising the direction and distance of where to go. The first computing device 902 groupcasts the content item to all the computing devices 904, 906, 908 in the group.

At 926, option 5 is to transmit a notification to the second, third or fourth computing device 904, 906, 908 (a receiving computing device) indicating an alternative way to access the content item. The first computing device 902 transmits a notification message to the third computing device 906 to request the content item via the second computing device 904, rather than via the groupcast. The third computing device 906 transmits a content request to the second computing device 904. The first computing device 902 groupcasts the content item to the other computing devices in the group (i.e., the second and fourth computing devices 904, 908). The second computing device 904 unicasts the content item to the third computing device 906.

At 928, option 6 is to transmit a notification to the second, third or fourth computing device 904, 906, 908 (a receiving computing device) to leave the groupcast. The groupcast metric and adaption module in the first computing device 902 may have tried one or more of the other options described herein, but was unable to overcome any issues in a condition of the sidelink channel. The groupcast metric and adaption module in the first computing device 902 generates a notification that the third computing device 906 should leave the groupcast session. The notification is transmitted to the third computing device 906, and the third computing device 906 leaves the groupcast session.

FIG. 10 shows a block diagram representing components of a computing device and dataflow therebetween for enabling actions to be performed based on feedback relating to a condition of a sidelink channel between computing devices, in accordance with some embodiments of the disclosure. Computing device 1000 (e.g., computing device 106, 110*a*, 110*b*, 206, 210*a*, 210*b*, 306, 310*a*, 310*b*, 310*c*, 406, 410*a*, 410*b*, 410*c*, 506, 510*a*, 510*b*, 606, 610*a*, 610*b*), as discussed above, comprises input circuitry 1004 and control circuitry 1008. Control circuitry 1008 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1002 by the input circuitry 1004. The input circuitry 1002 is configured to received inputs related to a computing device. For example, this may be via a touchscreen, a keyboard, a mouse and/or a microphone in communication with the computing device 1000. In other examples, this may be via a gesture detected via an augmented, mixed and/or virtual reality device. In another example, the input may comprise instructions received via another computing device, for example, a smart speaker. The input circuitry 1004 transmits 1006 the user input to the control circuitry 1008.

The control circuitry 1008 comprises a content item receiving module 1010, a sidelink initiation module 1014, a content item transmission module 1018, a feedback receiving module 1022, a feedback processing module 1026, an action identification module 1030 and an output module 1034 comprising an action performing module 1036. The input is transmitted 1006 to the content item receiving module 1010, where a content item is received. On receiving the content item, the content item receiving module 1010 transmits 1012 an indication to the sidelink initiation module 1014. At the sidelink initiation module 1014, a sidelink is initiated with one or more receiving computing devices. An indication is transmitted 1016 to the content item transmission module 1018, where the content item is transmitted to the one or more receiving computing devices. An indication is transmitted 1020 to the feedback receiving module 1022, where feedback is received from one or more of the one or more receiving computing devices. The feedback is transmitted 1024 to the feedback processing module 1026, where the feedback is processed. The processed feedback is transmitted 1028 to the action identification module 1030, where an action is identified based on the feedback. An indication of the action is transmitted 1032 to the output module 1034, where the action performing module 1036 performs the action.

FIG. 11 shows a flowchart of illustrative steps involved in enabling actions to be performed based on feedback relating to a condition of a sidelink channel between computing devices, in accordance with some embodiments of the disclosure. Process 1100 may be implemented on any of the aforementioned computing devices (e.g., computing device 106, 110*a*, 110*b*, 206, 210*a*, 210*b*, 306, 310*a*, 310*b*, 310*c*, 406, 410*a*, 410*b*, 410*c*, 506, 510*a*, 510*b*, 606, 610*a*, 610*b*). In addition, one or more actions of the process 1700 may be incorporated into or combined with one or more actions of any other process or embodiments described herein.

At 1102, a content item is received at a transmitting computing device and, at 1104, a sidelink channel is initiated between the transmitting computing device and one or more receiving computing devices. At 1106, a first portion of the content item is transmitted to the one or more receiving computing devices. At 1108, in response to a degradation in a condition of the sidelink channel between the transmitting smartphone and a receiving smartphone, feedback is generated and, at 1110, the feedback is transmitted from the receiving smartphone to the transmitting smartphone via the sidelink channel. Feedback may be generated, for example, in response to not receiving an expected portion of a content item, not being able to decode a portion of a content item and/or a request to retransmit transmitted data (including any messages and/or content). At 1112, an action is identified based on the feedback. At 1114, it is determined whether the available bandwidth of the sidelink channel is too low for the bitrate of the content item. If it is too low, then, at 1116, the quality of the content item is reduced and hence the bitrate of the content item, and at 1136, a subsequent portion of the content item is transmitted to the one or more receiving computing devices. If at 1114, it is determined that the available bandwidth of the sidelink channel is not too low for the bitrate of the content item, then the process proceeds to step 1118, where it is determined if the transmitting computing device is in an optimal position with respect to the receiving computing devices. If the transmitting computing device is not in an optimal position, at 1120 a notification for the transmitting computing device to move is generated and output at the transmitting computing device. At 1122, it is determined whether there has been an improvement in the condition of the sidelink channel (i.e., that the transmitting computing device has moved to a better location). If there has not been an improvement, at 1124, the transmission of the content item is handed over to one of the receiving computing devices, which proceeds to transmit subsequent portions of the content item to the other receiving computing devices at 1136. If it is determined that there is an improvement at 1122, the transmitting computing device transmits a subsequent portion of the content item at 1136.

If at 1118, it is determined that the transmitting computing device is in an optimal position, then at 1126, it is determined whether the receiving computing device is out of range. If the receiving computing device is not out of range, then the transmitting computing device transmits a subsequent portion of the content item at 1136. If it is determined that the receiving device is out of range at 1126, then, at 1128, a notification for the receiving computing device to move is generated and output at the receiving computing device. At 1130, it is determined whether there is an improvement in the condition of the sidelink channel (i.e., that the receiving computing device has moved to a better location). If there is an improvement, then, at 1136, a subsequent portion of the content item is transmitted. If, at 1130 there is not an improvement, at 1132, instructions to request the content item from another source are transmitted to the receiving computing device, and, at 1134, a subsequent portion of the content item is received at the receiving computing device from the source.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a first computing device, a content item;
   initiating, between the first computing device and each of a plurality of computing devices, a sidelink channel;
   transmitting, from the first computing device to each of the plurality of computing devices via the sidelink channel, a first portion of the content item;
   generating, at a second computing device of the plurality of computing devices, feedback, wherein the feedback is generated based on a condition of the sidelink channel;
   transmitting, from the second computing device of the plurality of computing devices to the first computing device, the feedback;
   identifying, based on the feedback, an action to perform; and
   performing the action, wherein performing the action comprises:
   determining a central area based on a determined location of each of the plurality of computing devices;
   determining that a relative location of the first computing device is outside of the central area; and
   based on, at least in part, determining that the relative location of the first computing device is outside of the central area, generating a notification for output at the first computing device, wherein the notification comprises instructions to change the relative location of the first computing device to be inside the central area.

2. The method of claim 1, wherein the feedback further comprises an identification of a change in radio conditions between the first computing device and the second computing device.

3. The method of claim 1, wherein the feedback further comprises a hybrid automatic repeat request message or a negative-acknowledgement message.

4. The method of claim 1, wherein performing the action further comprises:
   adapting, based on the feedback, a second portion of the content item; and
   transmitting, from the first computing device to the second computing device via the sidelink channel, the adapted second portion of the content item.

5. The method of claim 1, wherein the sidelink channel is a first sidelink channel and performing the action further comprises:
   receiving, at a third computing device, the content item;
   initiating, between the third computing device and each of the plurality of computing devices, a second sidelink channel; and
   transmitting, from the third computing device to each of the plurality of computing devices, a second portion of the content item.

6. The method of claim 1, wherein performing the action further comprises:
   identifying that a computing device of the plurality of computing devices cannot receive the first portion of the content item; and
   terminating the sidelink channel between the first computing device and the identified computing device, wherein terminating the sidelink channel further comprises transmitting a manifest file for a portion of the content item to the identified computing device.

7. The method of claim 1, wherein:
   the instructions are first instructions;
   the notification is a first notification;
   performing the action further comprises:
   determining a relative distance between the first computing device and the second computing device; and
   identifying that the relative distance is greater than a threshold distance; and
   the method further comprises generating a second notification for output at the second computing device, wherein the second notification comprises second instructions to reduce the relative distance below the threshold distance.

8. The method of claim 1, wherein the instructions are first instructions and performing the action further comprises:
   transmitting, to the second computing device, second instructions to request a second portion of the content item directly from a server;
   transmitting, to the server, a request for the second portion of the content item; and
   receiving, at the second computing device, the second portion of the content item.

9. A system comprising:
   a communication port;
   a memory storing instructions; and
   control circuitry communicably coupled to the memory and the communication port and configured to execute instructions to:

receive, at a first computing device and via the communication port, a content item;

initiate, between the first computing device and each of a plurality of computing devices, a sidelink channel;

transmit, from the first computing device to each of the plurality of computing devices via the sidelink channel, a first portion of the content item;

generate, at a second computing device of the plurality of computing devices, feedback, wherein the feedback is generated based on a condition of the sidelink channel;

transmit, from the second computing device of the plurality of computing devices to the first computing device, the feedback;

identify, based on the feedback, an action to perform; and perform the action, wherein the control circuitry configured to perform the action is configured to:

determine a central area based on a determined location of each of the plurality of computing devices;

determine that a relative location of the first computing device is outside of the central area; and based on, at least in part, determining that the relative location of the first computing device is outside of the central area, generate a notification for output at the first computing device, wherein the notification comprises instructions to change the relative location of the first computing device to be inside the central area.

10. The system of claim 9, wherein the control circuitry configured to generate the feedback is further configured to generate feedback comprising an identification of a change in radio conditions between the first computing device and the second computing device.

11. The system of claim 9, wherein the control circuitry configured to generate the feedback is further configured to generate feedback comprising a hybrid automatic repeat request message or a negative-acknowledgement message.

12. The system of claim 9, wherein the control circuitry configured to perform the action is further configured to:

adapt, based on the feedback, a second portion of the content item; and transmit, from the first computing device to the second computing device via the sidelink channel, the adapted second portion of the content item.

13. The system of claim 9, wherein the sidelink channel is a first sidelink channel and the control circuitry configured to perform the action is further configured to:

receive, at a third computing device, the content item;

initiate, between the third computing device and each of the plurality of computing devices, a second sidelink channel; and transmit, from the third computing device to each of the plurality of computing devices, a second portion of the content item.

14. The system of claim 9, wherein the control circuitry configured to perform the action is further configured to:

identify that a computing device of the plurality of computing devices cannot receive the first portion of the content item; and terminate the sidelink channel between the first computing device and the identified computing device, wherein terminating the sidelink channel further comprises transmitting a manifest file for a portion of the content item to the identified computing device.

15. The system of claim 9, wherein:

the instructions are first instructions;

the notification is a first notification;

the control circuitry configured to perform the action is further configured to:

determine a relative distance between the first computing device and the second computing device; and identify that the relative distance is greater than a threshold distance; and the control circuitry is further configured to generate a second notification for output at the second computing device, wherein the second notification comprises second instructions to reduce the relative distance below the threshold distance.

16. The system of claim 9, wherein the instructions are first instructions and the control circuitry configured to perform the action is further configured to:

transmit, to the second computing device, second instructions to request a second portion of the content item directly from a server;

transmit, to the server, a request for the second portion of the content item; and receive, at the second computing device, the second portion of the content item.

17. A method comprising:

receiving, at a first computing device, a content item;

initiating, between the first computing device and each of a plurality of computing devices, a sidelink channel;

transmitting, from the first computing device to each of the plurality of computing devices via the sidelink channel, a first portion of the content item;

generating, at a second computing device of the plurality of computing devices, feedback, wherein the feedback is generated based on a condition of the sidelink channel;

transmitting, from the second computing device of the plurality of computing devices to the first computing device, the feedback;

identifying, based on the feedback, an action to perform; and performing the action, wherein performing the action comprises:

identifying that a computing device of the plurality of computing devices cannot receive the first portion of the content item; and terminating the sidelink channel between the first computing device and the identified computing device, wherein terminating the sidelink channel further comprises transmitting a manifest file for a portion of the content item to the identified computing device.

18. The method of claim 17, wherein the feedback further comprises an identification of a change in radio conditions between the first computing device and the second computing device.

19. The method of claim 17, wherein the feedback further comprises a hybrid automatic repeat request message or a negative-acknowledgement message.

20. The method of claim 17, wherein performing the action further comprises:

adapting, based on the feedback, a second portion of the content item; and transmitting, from the first computing device to the second computing device via the sidelink channel, the adapted second portion of the content item.

* * * * *